United States Patent
Tholen et al.

(10) Patent No.: US 11,056,009 B2
(45) Date of Patent: Jul. 6, 2021

(54) SECURE CONTROL AND OPERATION OF DRONES

(71) Applicant: PERFORMANCE DRONE WORKS LLC, Huntsville, AL (US)

(72) Inventors: Lucas Tholen, North Mankato, MN (US); David Mitchell, Waterville, MN (US); Larry Dickinson, Waseca, MN (US); Lucas Anderson, Waseca, MN (US); Trevor Smith, Yonkers, NY (US); Ryan Gury, Mount Vernon, NY (US)

(73) Assignee: Performance Drone Works LLC, Huntsville, AL (US)

( * ) Notice: Subject to any disclaimer, the term of this patent is extended or adjusted under 35 U.S.C. 154(b) by 186 days.

(21) Appl. No.: 16/262,122

(22) Filed: Jan. 30, 2019

(65) Prior Publication Data

US 2019/0236962 A1 Aug. 1, 2019

Related U.S. Application Data

(60) Provisional application No. 62/624,259, filed on Jan. 31, 2018.

(51) Int. Cl.
*G08G 5/00* (2006.01)
*B64C 39/02* (2006.01)
(Continued)

(52) U.S. Cl.
CPC ......... *G08G 5/0013* (2013.01); *B64C 39/024* (2013.01); *G05D 1/0022* (2013.01);
(Continued)

(58) Field of Classification Search
CPC . G08G 5/0013; G08G 5/0069; H04W 12/009; H04W 12/001; B64C 39/024;
(Continued)

(56) References Cited

U.S. PATENT DOCUMENTS

| 4,447,828 A | 5/1984 | den Toonder |
| 4,454,543 A | 6/1984 | Lund et al. |

(Continued)

FOREIGN PATENT DOCUMENTS

| CN | 203658825 U | * | 6/2014 |
| CN | 203658825 U | | 6/2014 |
| CN | 109120371 A | | 1/2019 |

OTHER PUBLICATIONS

Durso Christopher M E et al: "The evolution of wireless video transmission technology for surveillance missions", Full Motion Video (FMV) workflows and reconnaissance (ISR) and situational awareness, Spie, 1000 20th st. Bellinggam WA 98225-6705 USA, vol. 8386, No. 1 (Year: 2012).*

(Continued)

*Primary Examiner* — Yazan A Soofi
(74) *Attorney, Agent, or Firm* — Vierra Magen Marcus LLP

(57) ABSTRACT

Techniques are described for the exchange of control signals between a controlled unmanned aircraft (i.e. drone) and a ground control station and for the transmission of communication signals, such as video, from the drone to the ground control station so that the signals are more difficult to intercept or jam. The video signal transmitted from the drone can be an analog RF signal employing one or more of video "scrambling", RF signal inversion, hopping, usage of a wide frequency range and other techniques. To secure the control signals between the drone and the ground control station, techniques can include hopping, encryption and use of a wide frequency range.

20 Claims, 19 Drawing Sheets

(51) Int. Cl.
G05D 1/00 (2006.01)
G05D 1/10 (2006.01)
H04B 1/713 (2011.01)
H04W 12/00 (2021.01)
H04N 7/171 (2011.01)
H04K 3/00 (2006.01)
H04W 12/03 (2021.01)

(52) U.S. Cl.
CPC .......... *G05D 1/0033* (2013.01); *G05D 1/101* (2013.01); *G08G 5/0069* (2013.01); *H04B 1/713* (2013.01); *H04K 3/25* (2013.01); *H04N 7/1713* (2013.01); *H04N 7/1716* (2013.01); *H04W 12/009* (2019.01); *H04W 12/03* (2021.01); *B64C 2201/148* (2013.01)

(58) Field of Classification Search
CPC .... G05D 1/0022; G05D 1/0033; G05D 1/101; H04B 1/713; H04N 7/1713; H04N 7/1716
USPC ......................................................... 701/120
See application file for complete search history.

(56) References Cited

U.S. PATENT DOCUMENTS

| 4,771,455 | A | | 9/1988 | Hareyama et al. |
| 4,910,772 | A | | 3/1990 | Matias et al. |
| 5,426,699 | A | * | 6/1995 | Wunderlich ......... H04N 7/1675 348/E7.056 |
| 5,442,700 | A | | 8/1995 | Snell et al. |
| 5,600,721 | A | | 2/1997 | Kitazato |
| 5,815,572 | A | | 9/1998 | Hobbs |
| 6,671,376 | B1 | | 12/2003 | Koto et al. |
| 2007/0294742 | A1 | | 12/2007 | Sprague |
| 2009/0273671 | A1 | * | 11/2009 | Gardner ................... H04N 7/18 348/144 |

OTHER PUBLICATIONS

EPO English translation of CN-203658825-U (Year: 2014).*
Kuhn, Markus G., "Analysis of the Nagravision Video Scrambling Method," Draft Technical Report, University of Cambridge, Jul. 9, 1998, 10 pages.
Coward J R., "Information security for unmanned systems," Management Brief, Jan. 1, 1994, pp. 1-15, [http://www.dtic.mil/cgi-bin/GetTRDoc?Location=U2&doc=GetTRDoc.pdf&AD=ADA286511].
Durso, Christopher, et al., "The evolution of wireless video transmission technology for surveillance missions," Full Motion View (FMV) Workflows and Technologies for Intelligence, Surveillance, and Reconnaissance (ISR) and Situational Awareness, SPIE, vol. 8386, No. 1, May 11, 2019, pp. 1-13.
International Search Report & The Written Opinion of the International Searching Authority dated Apr. 17, 2019, International Application No. PCT/US2019/015955.
European Office Action dated Sep. 24, 2020, EP Application No. 19707925.4-1208.

* cited by examiner

US 11,056,009 B2

SECURE CONTROL AND OPERATION OF DRONES

PRIORITY CLAIM

This application claims the benefit of U.S. provisional patent application 62/624,259, filed Jan. 31, 2018, which is hereby incorporated in its entirety by this reference.

BACKGROUND

Accurately controlling and communicating with radio controlled unmanned aircraft (i.e. drones) or other moving objects along a path is a complex task. A number of counter-unmanned aerial system are available to interfere with or jam the signals between a pilot and the drone. Consequently, it is important to be able to counteract such counter-unmanned aerial systems.

DETAILED DESCRIPTION

Figure 1:
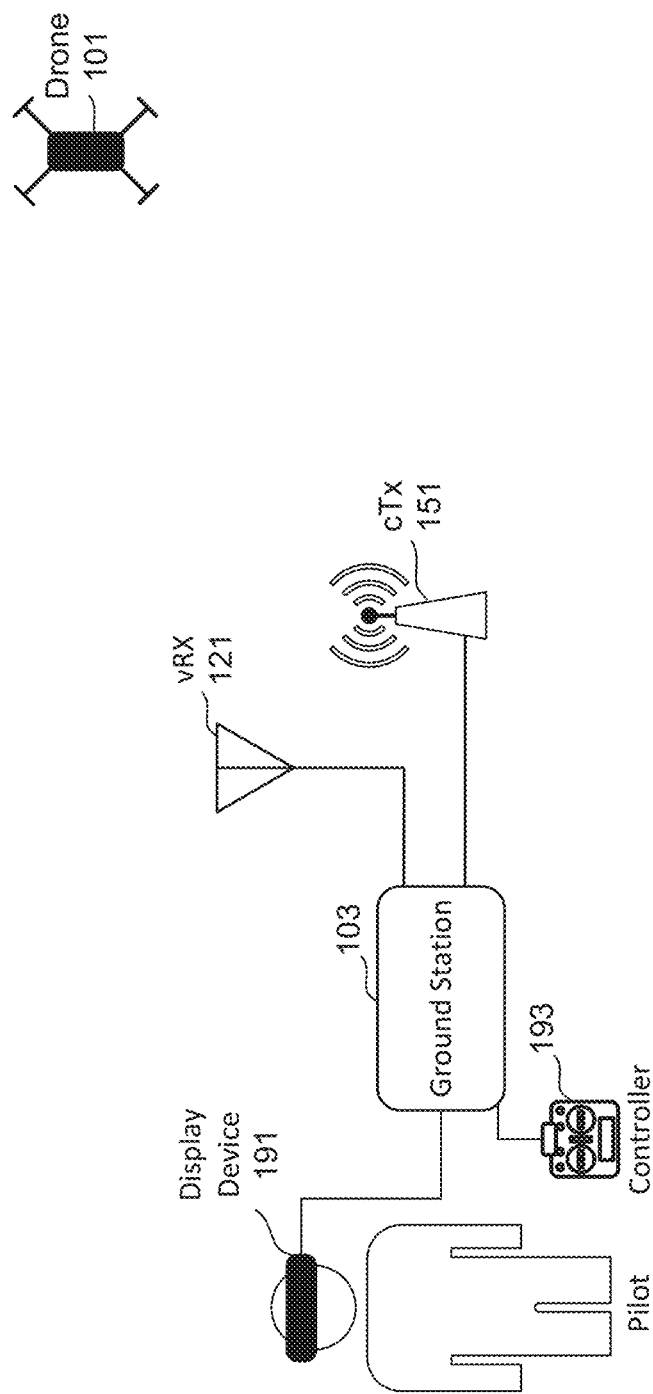
FIG. 1 is system diagram of pilot controlling a drone through use of use of a display and controller connected to a ground control station.

The following presents a system and techniques secure communication between a controlled unmanned aircraft (i.e. drone) and a pilot flying the unmanned aircraft. Although the primary examples discussed in the following are high-speed radio controlled unmanned aircraft, the techniques can be applied more generally to remotely controlled objects. The drone (or other object) can communicate with the pilot through a combination of signals. A first radio system can monitor a video or other communication signals transmitted by the object as it travels along a path. A second radio system may transmit and receive control signals with the object. These signals can be both monitored and interfered with by Counter-Unmanned Aerial Systems (C-UASs), including a number of commercially available off the shelf systems. The following presents a number of techniques to reduce or eliminate this monitoring and interference.

More specifically, the following considers design parameters that address technical requirements for a secure, tactical grade drone for rapid deployment operations. These methods can be implemented in various form factors, such as various available small drones, but that include anti C-UAS (Counter-Unmanned Aerial System) radio technologies to prevent detection and jamming systems, including commercially available off the shell anti C-UAS systems. Some examples of commercially available C-UAS technologies include: Drone Defender; R&S ARDRONIS-I; SRC Silent Archer/Gryphon Sensors R1400; Sierra Nevada Corporation (SNC) SkyCAP; MyDefence; and Dedrone. After describing some technical details of the radio system, embodiments for counteracting detection and jamming are described.

The embodiments described below can include both a first communication channel and a second communication channel between the pilot and the drone. The first communication channel can be a video signal from the drone to a display device for the pilot, and the second communication can be a control link between the pilot and the drone.

For the video-transmitter system by which the drone can send video data to a ground station's video receiver, one set of embodiments can include an analog, NTSC formatted camera and an FM modulated transmitter. The FM signal can be processed so as to be obfuscated such that the signal cannot be intercepted and received with a demodulation system, including commercial off the shelf systems, in which the video can be viewed directly. Among the features that the video-transmitter system can include as part of the processing to make the signal more difficult to monitor, interfere with, or both are analog video; video "scrambling"; inverting of the RF signal; channel hopping; and use of a wide frequency range. The dynamic parameters used by the video-transmitter system can include hopping sequences, hopping frequency tables, output power, and scramble code, for example.

With respect to the control link, embodiments can include a low latency link (uplink) for real time control of the drone, and a dynamic bandwidth downlink for drone telemetry data and digital mission payload. Data can be encrypted, and a robust control uplink used. Among the features that the control link can be processed to include so as to be more difficult to intercept or interfere with are a digital control link; channel/frequency hopping; encryption; and use of a wide-frequency range.

Depending on the embodiment, a secure drone system can incorporate some or all of these features. Although the following is primarily presented in the context of a single pilot and single drone, this can be extended to multiple active drones. Furthermore, although the described embodiments are for a first-person view (FPV) video and control, higher resolution imagery payloads can also be incorporated.

The embodiments outlined here present examples of the hardware and software embodiments for the communication system, including a ground station for pilot control and first-person view video, and a video transmitter (vTX) and control radio circuitry in the drone. The ground station can output composite video (such as in the NTSC (National Television System Committee) format, for example) for use by the pilot and ground observers. In one set of embodiments, the pilot can use goggles with NTSC screens for optimal immersion. FIG. 1 shows one embodiment of a such a system.

FIG. 1 is system diagram of pilot controlling a drone through use of use of a pilot display device 191 and pilot controller 193 connected to a ground control station 103. While a drone 101 is flying along a path, it is transmitting video data from an on-board antenna vTX and is also in communication with a ground station 103 by way of a control radio. The ground station 103 sends and receives control channel information to and from the drone by way of control antennae 151. The ground station 103 receives video from the drone by way of video receiver antennae vRX 121. In this embodiment, the pilot receives the video from the drone by way of a head mounted display device 191. The pilot inputs commands for the drone using the pilot's controller 193. Although referred to in the following as a ground control station 103, more generally this can be referred to as a control unit as in some embodiments it many not be located on the ground, but in an aircraft, for example, or other location. Additionally, although the ground control station 103, controller 193 and display device 191 are all represented as distinct, these may be integrated to varying degrees in different embodiments, so that, for example, some elements presented as being part of the ground control station 103 may be incorporated in the controller 193.

Figure 2:
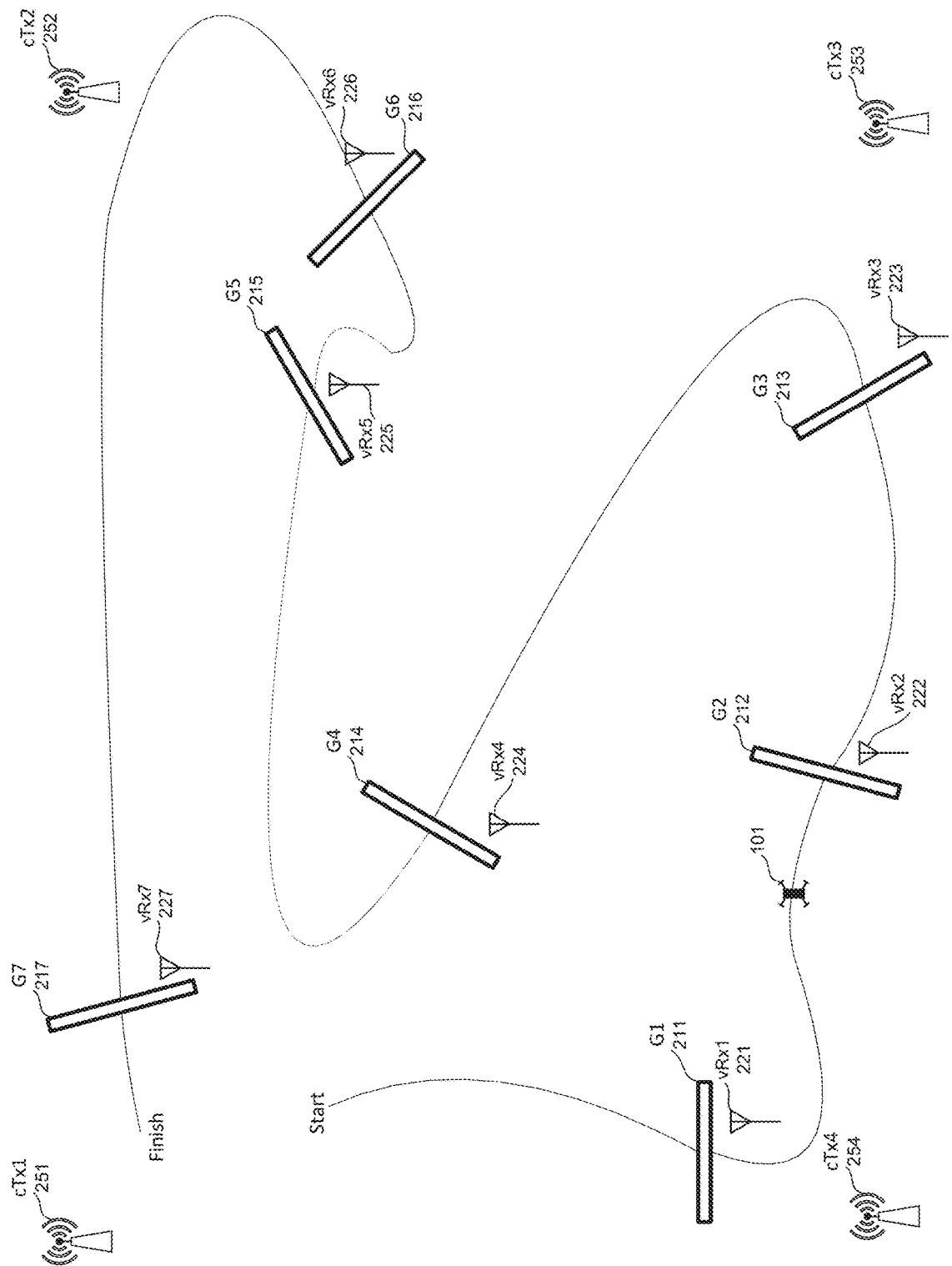
FIG. 2 is a top view of an example a drone moving along a path.

FIG. 2 is a top view of an example a drone 101 moving along a path, in this example a course that passes from a start location through the gates G1-G7 211-217 sequentially to arrive at the finish location, but in other cases this can be more general path that is not determined by a set of gates. A set of control transceiver antennae cTx1-cTx4 251-254 cover the region that includes the path in order to supply control signals to drones on the course and also receive data back from the drones, as discussed further below. A set of video receivers vRx1-vRx7 221-227 receive the video data as transmitted by the drone 101. In this example of a course defined by the gates G1-G7 211-217, each of the video receivers is associated with a gate, but in the more general situation the video receivers can be arranged to cover the area through which the drone may pass over when the path is not based on a set of gates. As the drone 101 travels along a path, the pilot will receive the video data from the drone for display on the display device 191 and telemetry over the control channel and use the controller 193 to fly the drone.

Figure 3:
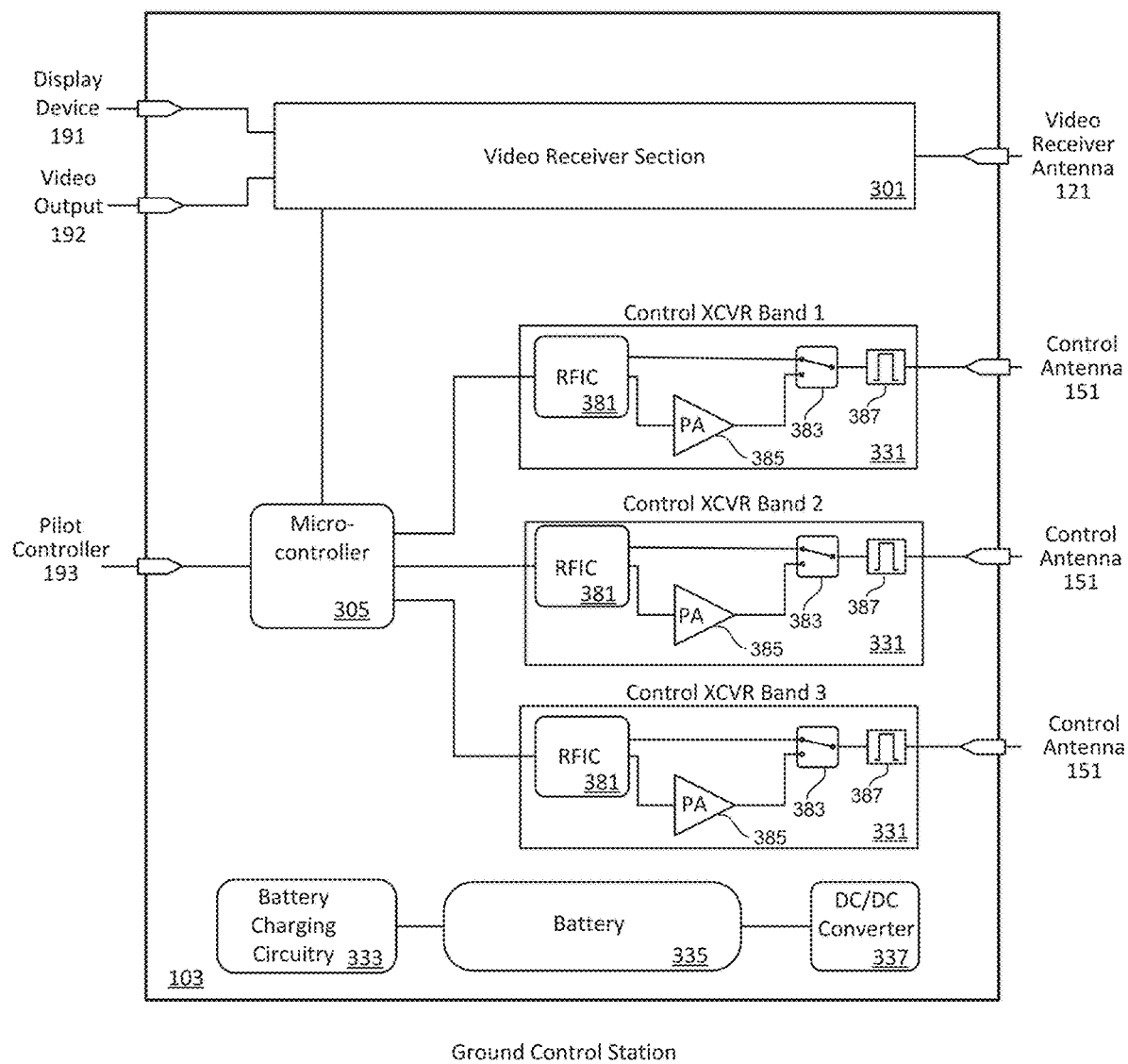
FIG. 3 is a block diagram for an embodiment of a ground control station.

FIG. 3 is a block diagram for an embodiment of the ground control station of FIG. 1. In this example, the ground control station 103 is shown with three input/outputs for control antennae and a corresponding three control transceivers XCVR 331 and with two video receiver antennae for the video receiver section 301, but other embodiments can have fewer or larger numbers of these elements. Depending on the embodiment, the antennae may vary in form factor from single, wideband antenna to multiple frequency selective antennae.

Microcontroller 305 is connected to the used to the video receiver section 301 and also the Radio Frequency Integrated Circuit (RFIC) 381 in each of the control transceivers XCVR 331. In the embodiment of FIG. 3, the video receiver section 301 has an output for the display device 191 and also an additional video output 192 in, for this example, an NTSC format. The video receiver section 301 is discussed further below with respect to FIG. 6.

The control transceiver XCVR 331 for each band is configured to be connected to a corresponding antenna. Each control transceiver XCVR 331 contains components required to transmit and receive digitally modulated control data used to navigate the drone. The connection to the corresponding control antenna is through a filter 387, where a switch 383 connects the filter 387 to the RFIC 381 on either a receive path or, through a power amplifier PA 385, a transmit path.

To supply power to the ground control station, a battery 335 can be used. A battery charging circuit 333 is also included, along with a DC/DC converter 337 to supply the desired voltage levels for the circuitry. In other embodiments, AC power can be used, along with an AC/DC converter.

Figure 4A:
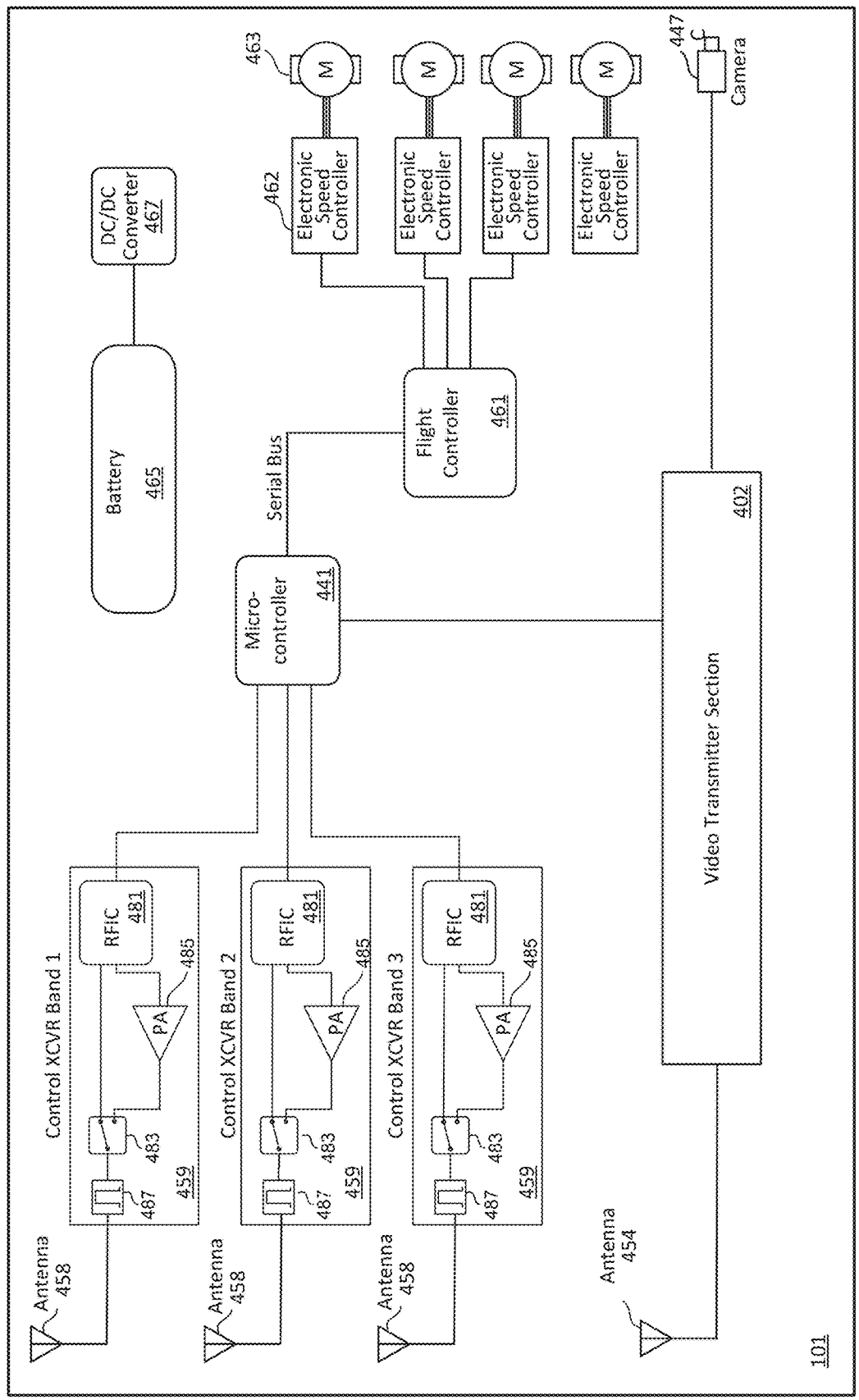
FIG. 4A a block diagram for an embodiment for a drone.

FIG. 4A a block diagram for an embodiment for a drone 101, such as the drone of FIG. 1. Microcontroller MCU 441 is connected to the video transmitter section 402 and the Radio Frequency Integrated Circuit (RFIC) 481 in each of the control transceivers 459. Flight control data is sent to the flight controller 461 over a serial bus. Telemetry data is received from the flight controller 461 and sent back through the control transceivers 459 to the control transceivers 331 of the ground control station 103 of FIG. 3.

In addition to being connected to the microcontroller MCU 441, the video transmitter section 402 is connected to a camera 447 to provide first person view (FPV) of the drone for real time navigation by the pilot and an antenna 454 for transmitting the video data to the ground control station 103. The video transmitter section 402 is discussed in more detail with respect to FIG. 5.

The control transceiver XCVR 459 for each of the (in this example) three bands contains the components to transmit and receive digitally modulated control data used to navigate the drone. Each control transceiver XCVR 459 is connected to a corresponding antenna 454. The antenna 454 may vary in form factor from a single, wideband antenna to multiple frequency selective antennae. For each control transceiver XCVR 459, the corresponding antenna 454 is connected to the RFIC 481 through a filter 487. A switch 483 between the filter 487 and RFIC 481 allows for RFIC 481 to connect the antenna 458 through the power amp PA 485 on a transmit path and bypass the power amp PA on a receive path. On the receive path, the control data is passed on to the microcontroller MCU 441 and then on to the flight controller 461.

Based on the received controller data, the flight controller 461 drives the electronic speed controller 462 to drive the propeller motors 463. The shown embodiment is for a quadcopter form factor, but other embodiments would have the appropriate number of propellers and motors 463 and electronic speed controllers 462. The battery 465 and DC/DC converter 467 supply the power for the components.

Figure 4B:
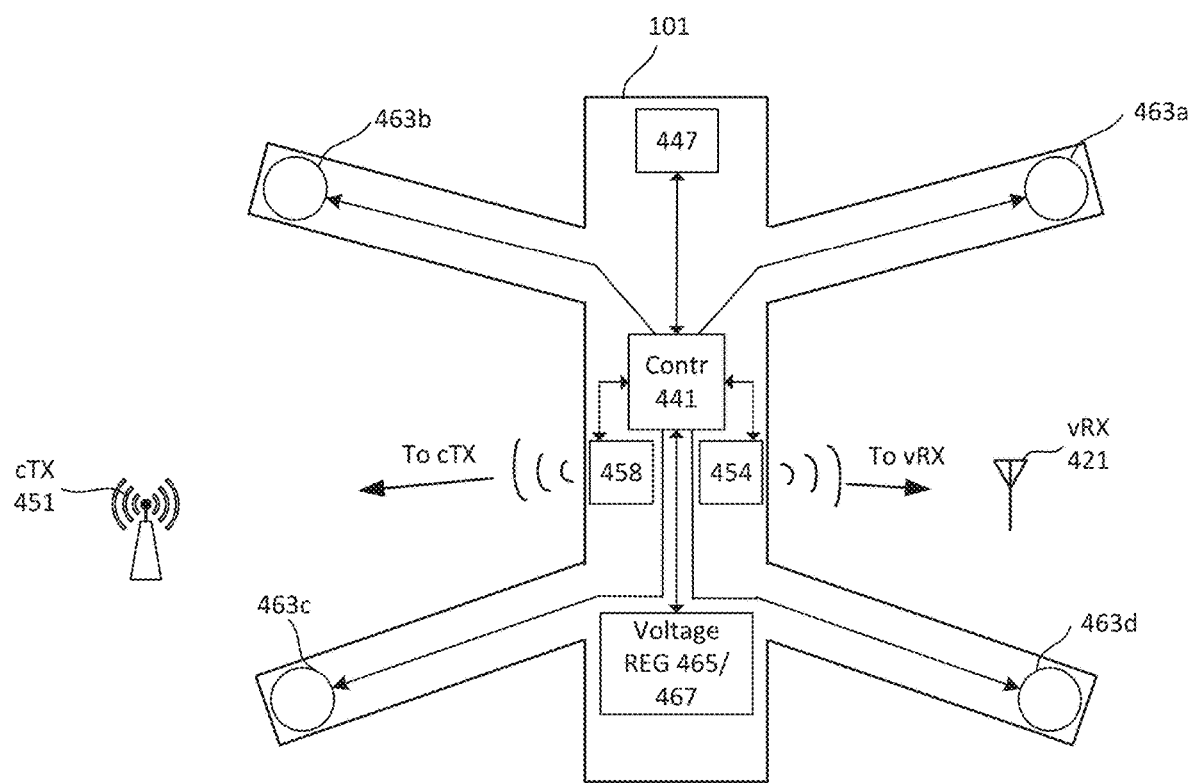
FIG. 4B illustrates some of the elements of FIG. 4A on an example of a drone form factor.

FIG. 4B is a simplified representation of how some of the components for FIG. 4A are arranged on a quadcopter form factor. (To simplify the figure, many of the elements illustrated in the FIG. 4A are lumped in with the controller block 441 of FIG. 4B.) FIG. 4B shows controller 441 connected to motors/propellers 453a-d, the voltage source and regulator 465/467 corresponds to the DC/DC converter and battery of FIG. 4A. The shown embodiment of the drone 101 places each of the four propellers on arm extensions at the four corners of the drone. The camera 447 is at the front drone to provide the first-person view video to the pilot. The controller 441 is connected (through elements not shown in FIG. 4AB) to control signal antennae 458 to exchange signals with the control transceiver antennae 451 and to supply video data through antenna 454 to transmit to video data received antenna vRX 421.

Figure 5:
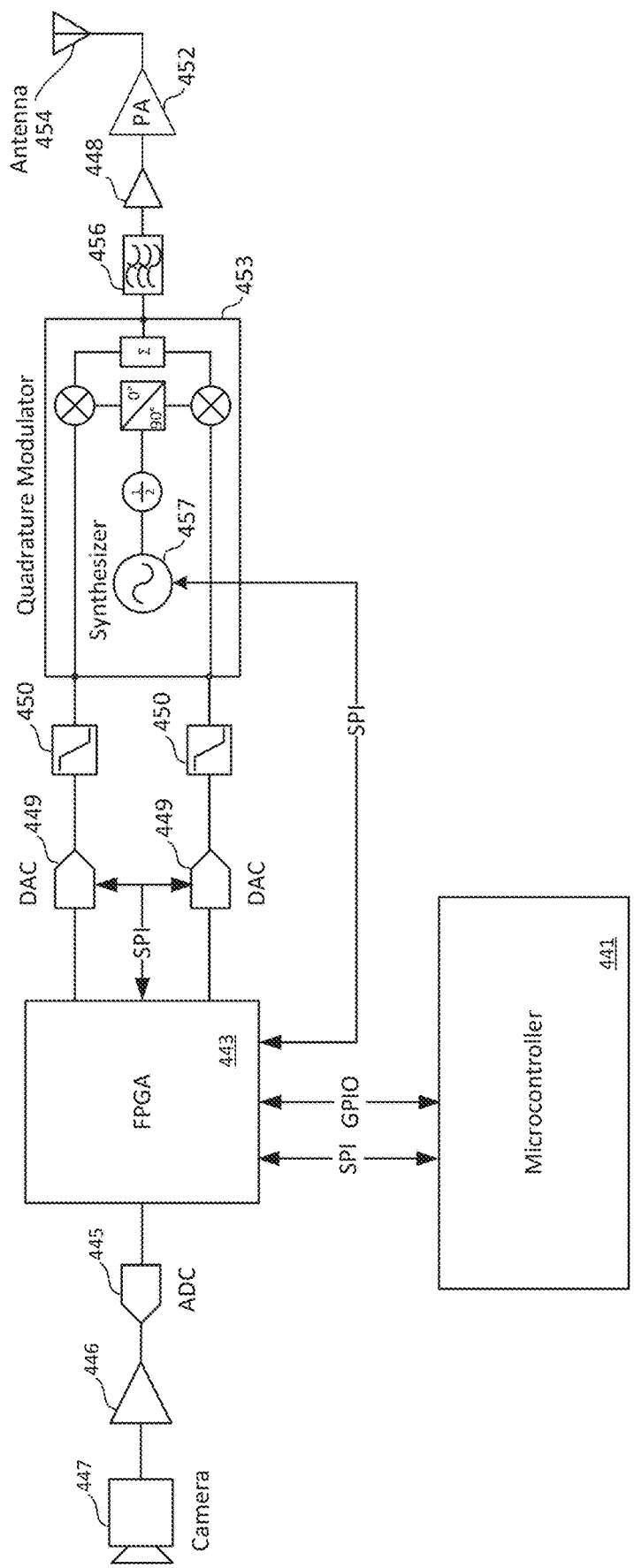
FIG. 5 is a block diagram for an embodiment of some video transmitter elements of a drone.
Figure 6:
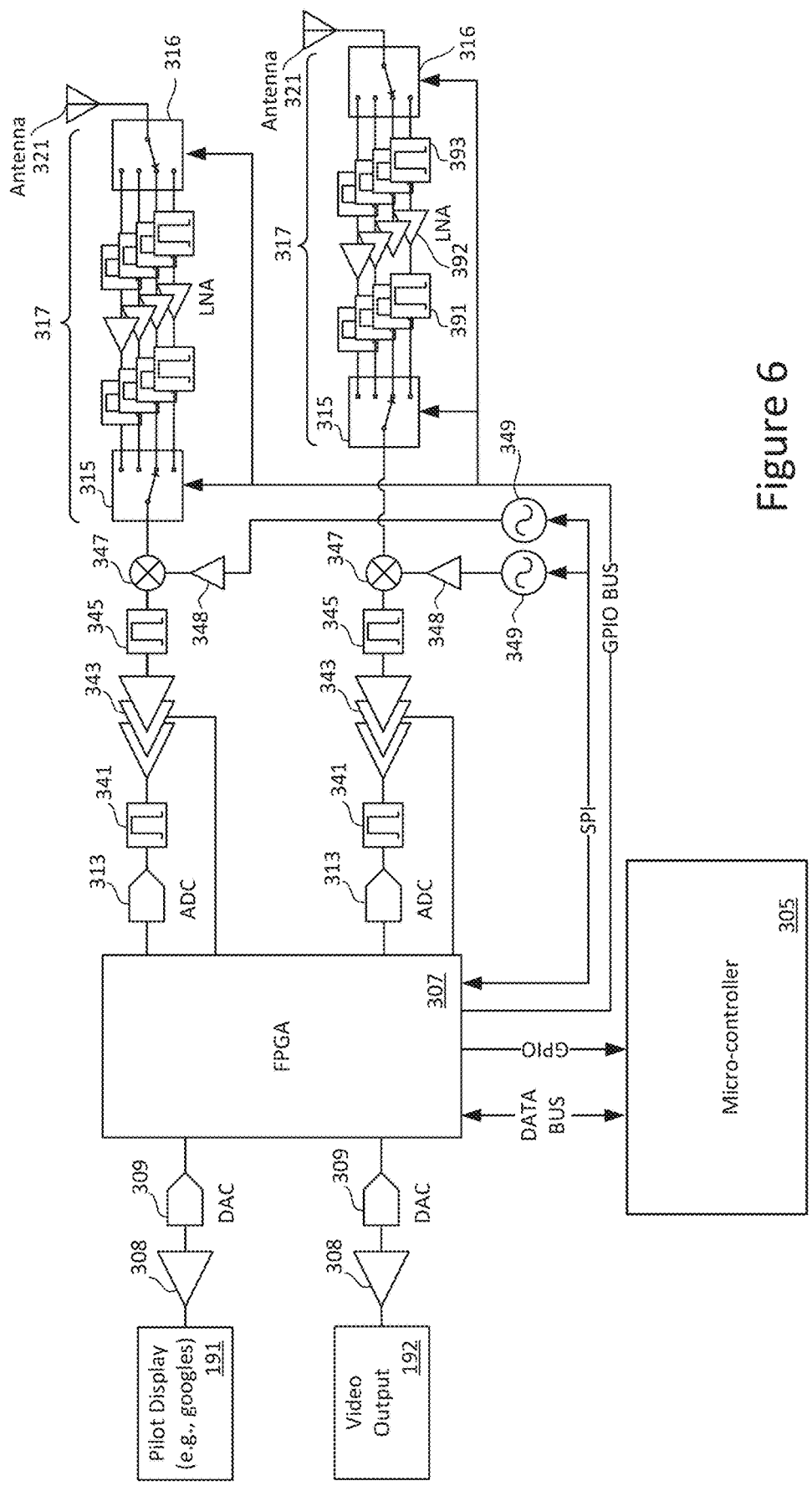
FIG. 6 is a block diagram for an embodiment of a multi-band diversity receiver architecture.

FIGS. 5-18 consider some of the components of FIGS. 3 and 4A and their operation further. FIGS. 5 and 6 respectively consider the video transmitter/receiver specifications.

FIG. 5 is a block diagram to describe embodiments for the video transmitter section 402 of FIG. 4A in more detail. In addition to video transmitter section 402, FIG. 5 also includes the camera 447, video signal antenna 454, and microcontroller MCU 441 from FIG. 4A. The microcontroller MCU 441 can be used to configure the field-programmable gate array FPGA 443 for digital signal processing.

Camera 447 provides first person view (FPV) of the drone for real time navigation by the pilot. The camera 447 is an analog camera, providing analog data in a NTSC format in the embodiment illustrated in FIG. 5. Other formats can be used, but, as described in more detail below, the examples mainly presented here use the interlaced analog video NTSC format, but other examples can include PAL (Phase Alternating Line) or SECAM (SÉquentiel Couleur À Mémoire) formats. For digital signal processing, the analog to digital converter ADC 445 is used to sample the analog video data from the camera 447 and provide a digital data stream to FPGA 443, where, depending on the embodiment, an amplifier 446 or other elements may be included in the path. After any processing in FPGA 443, FPGA 443 provides copies of the video signal modulated into the frequency domain to form In-phase (I) and Quadrature (Q) baseband signals. On the other side of FPGA 443, digital to analog converter DAC 449 perform a digital to analog conversion of the baseband video signal, which can be filtered with low pass filters 450 and supplied to the Quadrature Modulator 453.

The Quadrature Modulator 453 converts the baseband I/Q signals to an FM modulated RF signal. Synthesizer 457 can provide a local oscillator frequency hopping carrier to up-convert the modulated FM signal. In some embodiments the FM signal includes only a video component, but other embodiments can also include audio or other data. The resultant FM modulated analog video signal can filtered at filter 456 to reduce unwanted emissions and pass through any initial amplifier stages 448 before power amplifier PA 452 provides the signal for transmission by the antenna 454.

The microcontroller MCU 441 can be connected to FPGA 443 by an SPI (Serial Peripheral Interface) bus, a GPIO (General-Purpose Input/Output) bus, or both, for example, to control the video transmitter section 402 and configure the field-programmable gate array FPGA 443 for digital signal processing. FPGA 443 can be connected to the frequency synthesizer 457 and the DACs 449 by use of an SPI bus, for example. In addition to digital signal processing at FPGA 443, the signal can be further processed to make it more difficult to monitor or jam. For example, the video transmitter section 402 can sample the video from the camera 447, perform scrambling on selected lines, and frequency modulate the signal onto a carrier provided by the synthesizer 457. Depending on the embodiment, the synthesizer 457 may or may not be integrated into the quadrature modulator 453. The FPGA 443 is connected to control synthesizer 457 to provides the frequency hopping carrier frequency for the modulated analog FM signal. The modulated carrier from the quadrature modulator 453 is then amplified by the power amplifier 452 and sent out on the antenna 454. In an example set of embodiments, the video transmitter section 402 can provide a maximum RF Transmit Power of 7 W, where the resolution per step size can be at least 1 dB; where greater resolution is acceptable, though not required. In the example set of embodiments, the video transmitter section 402 can be capable of operating over 500 MbHz-1800 MHz and function over an operating temperature range of 0° C. to +70° C. (TBD).

FIG. 6 is a block diagram to describe embodiments for the video receiver section 301 of the ground control station 103 of FIG. 3 in more detail. In addition to video receiver section 301, FIG. 5 also includes the display device 191 and additional video output 192, video antennae 321, and ground station microcontroller MCU 305 from FIG. 3. The microcontroller MCU 305 can be used to configure and control the field-programmable gate array FPGA 307 for digital signal processing, where the microcontroller MCU 305 can be connected to FPGA 307 by an SPI bus, a GPIO bus, or both, for example FPGA 307 can perform digital data processing on the video received from the antennae 321, including real time de-scrambling of the video data, filtering, and scaling functions. FPGA 307 provides a digital data stream of de-scrambled video to the DACs 309. DACs 309 in turn provide digital to analog conversion of the video data stream, which can then be provided to a display device 191 for the pilot or other analog video outlet 192, where the path can include an amplifier 308 or other additional elements, depending on the embodiment.

FPGA 307 can provide also provide frequency control over an SPI, for example, bus to the voltage-controlled oscillators (VCO)s 349, whose outputs are supplied as local oscillator signals to the mixers 347 (by way of drivers 348 in this example). The Video Receivers 317 are configured to receive radio frequency (RF) signal from the video receiver (vRx) antenna 321 and supply the RF signals to the mixers 347, where the local oscillator signal from the VCOs 349 is used to convert the RF signals to an intermediate frequency (IF) or baseband frequency. The shown embodiment includes four video receiver paths for each video receiver 317, but other embodiments can use different numbers. Each of the paths of the video receivers 317 is here shown to receive its input through a filter 393, after which the signal passes through a low noise amplifier LNA 392, followed by a second filter 391. To supply the different video receiver paths from a single vRx antenna 321, a pair of switches 315 and 316 are included on either side. The switches 315, 316 are connected to FPGA 307 so that they can be used to select the RF band based on the hopping sequence and index number, as discussed in more detail below. After down-conversion at mixers 347, the selected converted video signal from the video receivers 317 are supplied to ADCs 313 to be digitized for signal processing in FPGA 307. Depending on the embodiment, the converted analog video from the mixers 347 can be sent through amplifiers 343, which can be controlled by the FPGA 307, with filters 345 and 341 on either side to remove unwanted spurious out of band signals before the ADCs 313.

On the ground station side, the components of video receiver section 301 perform the reverse operations of the hopping and scrambling relative to the drone's video transmitter section 402, which un-doing these operations can lead to greater complexity than originally performing them. The embodiment of FIG. 6 illustrates a multi-band diversity receiver configuration of two receiver paths for the two video receivers 317, where other embodiments can use one or more additional receivers. Wideband receivers are susceptible to interference and jamming. The switchable multiple band receiver architecture illustrated in FIG. 6 allows wideband operation with channel filtering to improve immunity to interference and jamming. The diversity will help with multipath and improve sensitivity. Each receiver band can have two preselect filters to provide an input to a segment of the overall band; each receiver shall be capable of hopping within its segmented band through use of switches 315 and 316. Which side of the band that the video signal is transmitted from the drone's video transmitter section 402 can determine whether a high or low side mix is used, which can significantly improve the image rejection of the video receiver section 301.

In embodiments presented here, the video transmitter on the drone can be capable of hopping the analog video across a large frequency range to limit exposure to intentional or other radio interference. The video receiver on the ground station can use the segmented receiver architecture to simultaneously receive multiple frequency bands. In the event of an interferer, the frequency affected can be temporarily removed from the hopping channel table. In one set of embodiments, hopping can occur once during the initial vertical frame sync interval of Field 1 of the (interlaced) NTSC signal, and then again during the vertical frame sync on Field 2. This arrangement also provides scrambling as only ½ of a given frame can be demodulated at a given center frequency, and a successful consecutive hop is required to complete a frame. The frame rate is 30 fps (frames per second), resulting in 60 vertical sync intervals per second and therefore producing a hopping rate of 60 hops per second.

Counter unmanned aerial systems, such as commercial off the shell solutions, will often be limited to a video bandwidth of, for example, 100 MHz Therefore, by hopping at a much higher total deviation the drone-ground base system can operate outside of the hardware limitations of counter unmanned aerial systems in order to avoid detection. For example, the drone-ground base system can use the 500 MHz to 1.8 GHz spectrum, where in some embodiments the spectrum may be subject to antenna limitations.

Figure 7:
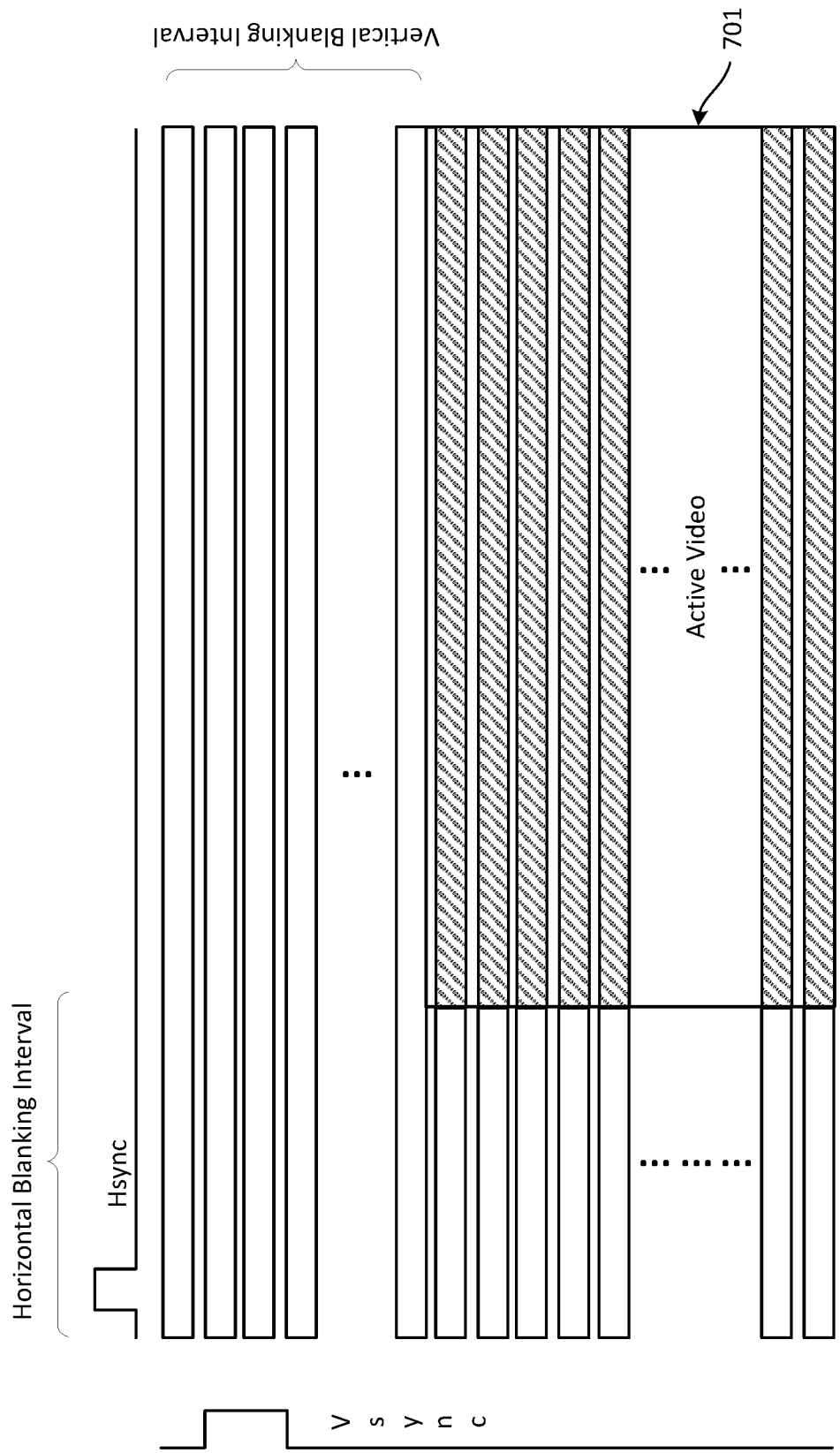
FIG. 7 is a schematic illustration of the structure of a frame of video data.

To provide context, FIG. 7 is a schematic illustration of the structure of a frame of video data. When a video image is displayed on a television or other display, the image is formed of a series of rows of pixels presented in a sequence of frames. In FIG. 7, these pixels of active video 701 are represented by the lines with the diagonal hashing. Additionally, a preceding portion of each of these lines of active data pixels and a preceding number of lines are "blanking intervals", which is a portion of the frame not typically displayed. The origin and much of the terminology related to these blanking intervals is historical, from when televisions used cathode ray tubes that were illuminated by moving beams of electrons very quickly across the screen. Once the beam reached the edge of the screen, the beam was switched off and the deflection circuit voltages (or currents) are returned to the values they had for the other edge of the screen. This would have the effect of retracing the screen in the opposite direction, so the beam was turned off during this time and this part of the frame's pixel is the "horizontal blanking interval" of each line that precedes the portion of active video. At the end of the final of active video in a frame, the deflection circuits would need to return from the bottom of the screen to the top, corresponding the "vertical blanking interval" of the first several lines of a frame that contain no active video. Although a modern digital display does not require the time for the deflection circuit to return from one side of a screen to the other, the blanking intervals, originally retained for back-compatibility, have been maintained for additional data, such as sub-titles or closed-caption display data, and control data.

More specifically, FIG. 7 depicts a single frame of video, such as would be present on display device 191. In the NTSC format, a single frame is transmitted typically in ¹⁄₆₀ second. The frame of FIG. 7 shows two basic time periods within the frame, corresponding to the active video and blanking intervals shown in white, where the active period typically uses about 85% of the frame's content. FIG. 7 also illustrates the horizontal synchronization pulse (Hsync), that separates the horizontal lines, or scan lines, of a frame. The horizontal sync signal is a single short pulse which indicates the start of every line, after which follows the rest of the scan line. The vertical synchronization pulse (Vsync) is also shown and is used to indicate the beginning of a frame or, in an interlaced embodiment where a frame is made up of alternating fields, to separate the fields. The vertical sync pulse occurs within the vertical blanking interval. The vertical sync pulse occupies the whole line intervals of a number of lines at the beginning and/or end of a scan when there is no active video. In a progressive format, all of the scan lines of a frame are presented sequentially to the display. In an interlaced format, such as NTSC, the frame is made up of first and second fields, corresponding to the odd and even lines of a frame, where the fields are alternated to provide the frames for the display.

Returning to the hopping of the video signal transmitted by the drone, in order to change frequencies or frequency hop the video signal, the drone's video transmitter section 402 and the ground station's video receiver section 301 need to be synchronized so that they are both on the same frequency at the same time. To accomplish this, the drone will not frequency hop until frequency hopping has been enabled by the ground station.

Figure 8:
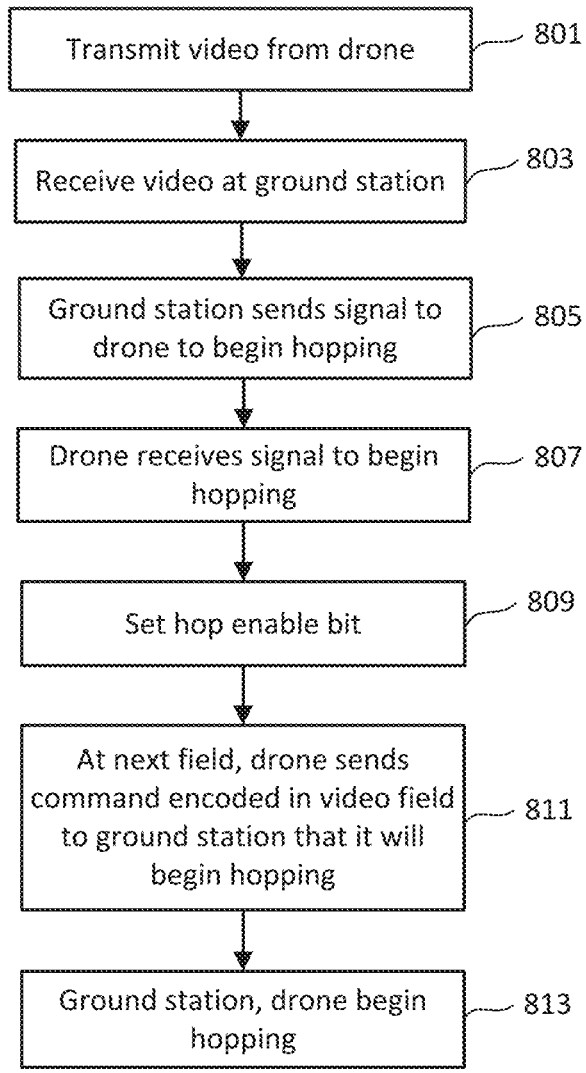
FIG. 8 is a flowchart illustrating an embodiment of a process for beginning synchronized hopping.

FIG. 8 is a flowchart illustrating an embodiment of a process for beginning synchronized hopping. Beginning at step 801, the video transmitter section 402 of a drone 101 begins transmitting a video signal, which is then received by the video receiver section 301 of a ground station 103 at step 803. The use of a modified video signal for this purpose is illustrated below with respect to FIGS. 9 and 10. When the drone video is received by the ground station 103, at step 805 the ground station 103 sends a signal to the drone 101 via the ground station control radio blocks 331 to start hopping. The drone's control transceivers 459 receive the signal to begin hopping at step 807. To enable hopping, at step 809 a hop enable bit (uP Hop Enable) can be set on in the drone's FPGA 443, as discussed in more detail below. An embodiment of the hop enable steps and timing is illustrated below with respect to FIG. 11. As there is latency with respect to the video signal in this path, and the drone's video signal will not begin hopping immediately.

To account for the latency, when the command to start hopping is received by the drone 101 at step 807, the video transmitter section 402 will stay on its current channel until the end of the next field. At step 811, the drone can pass a command embedded in the video signal to begin hopping down to the ground station 103 encoded in the video field. At step 813, both the ground station 103 and drone 101 begin hopping at the conclusion of that field. On the drone side, the video transmitter section 402 can implement frequency hopping by the frequency synthesizer 457 changing the frequency supplied to the quadrature modulator 453 in response to control signals from FPGA 443. On the ground station side, the video receiver section 301 of ground station 103 can use the switches 315 and 316 as controlled by FPGA 307 for the hopping.

To facilitate the hopping and synchronize the video transmitter section 402 of the drone 101 and the video receiver section 301 of ground station 103, the video signal can be modified. In some embodiments this can be done by modifying the blanking interval of the video signal, as can be explained with respect to FIGS. 9 and 10.

Figure 9:
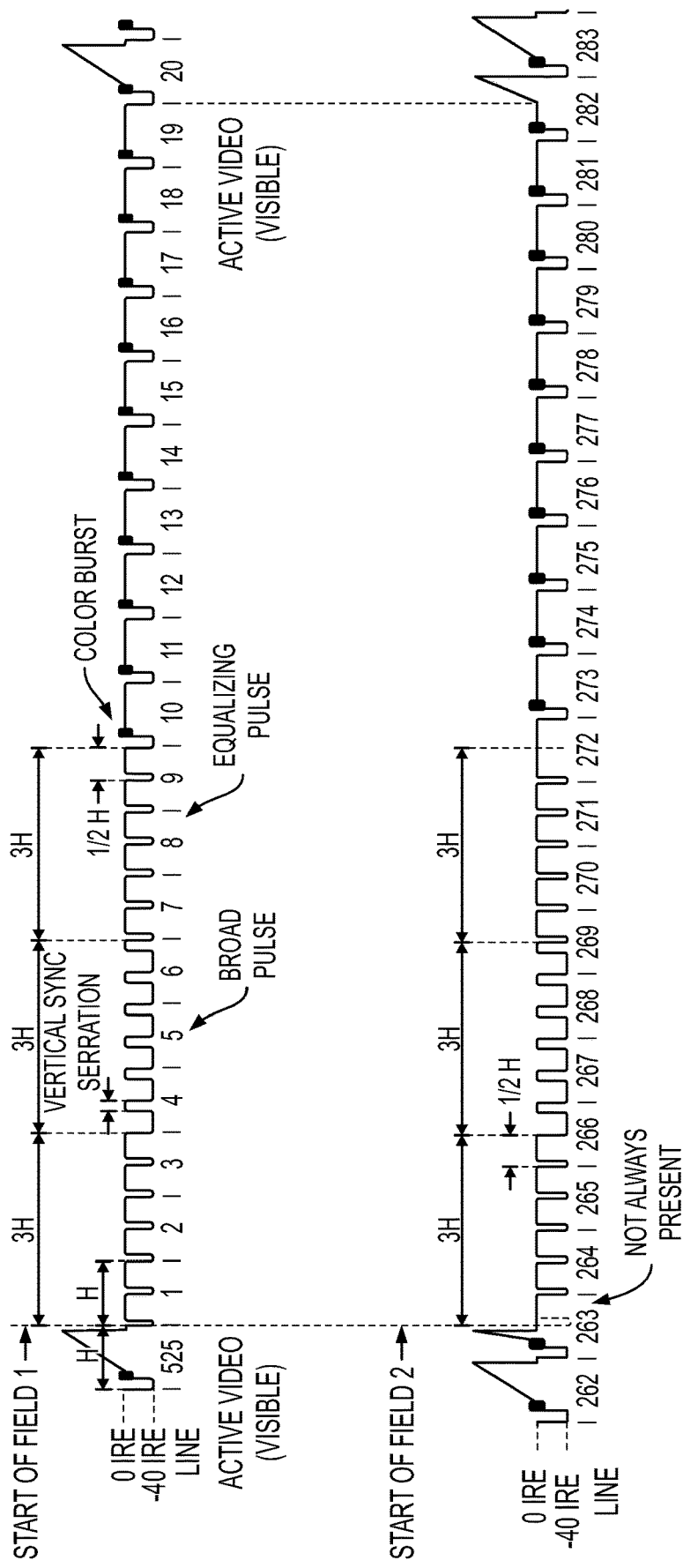
FIG. 9 illustrates a normal NTSC vertical blanking and synchronization interval.
Figure 10:
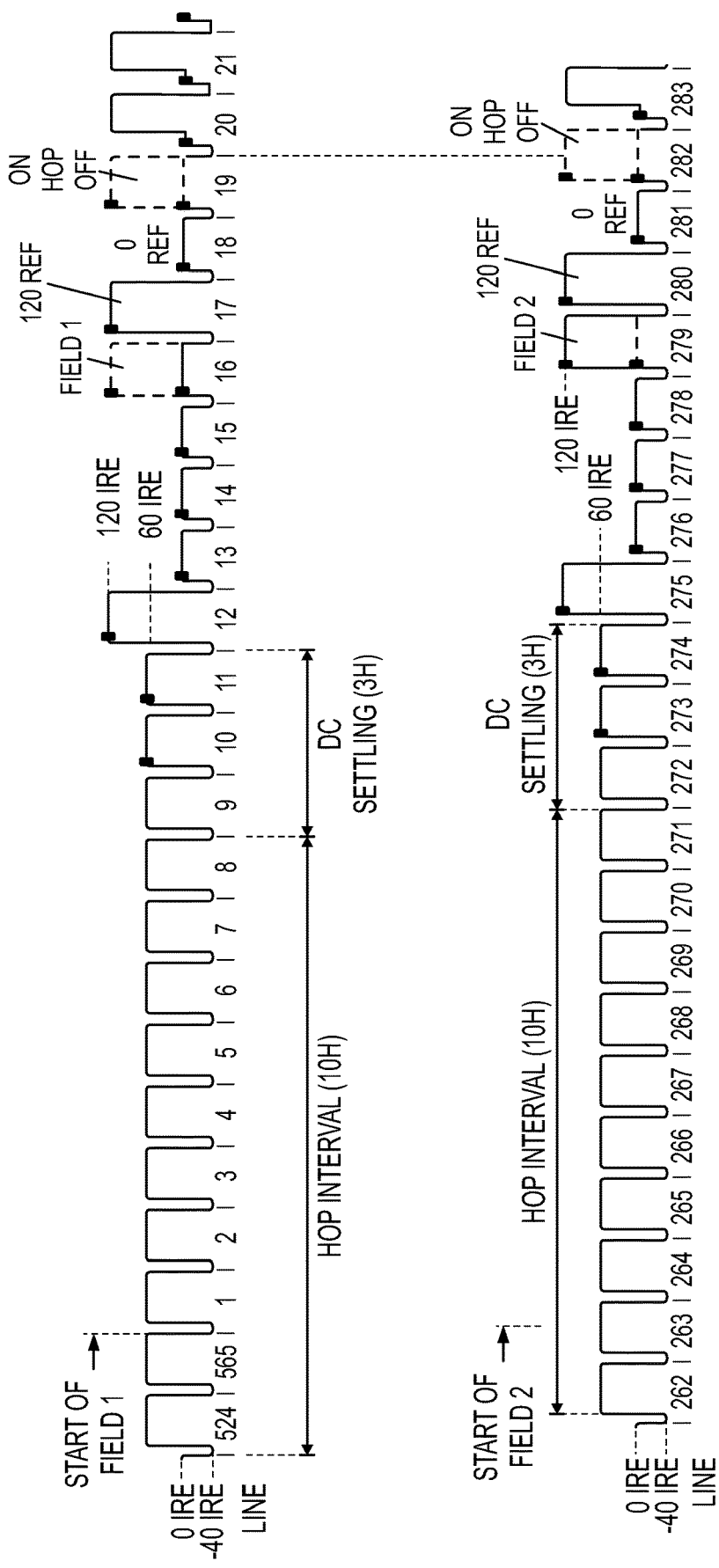
FIG. 10 illustrates a modified NTSC vertical blanking and synchronization interval.

FIGS. 9 and 10 respectively illustrate a standard vertical synchronization and blanking interval and a vertical synchronization and blanking interval modified to implement a hopping interval in an example based on interlaced video signals in an NTSC format. At top FIG. 9 represents a sequence of video lines corresponding to Field 1, with the video lines corresponding to Field 2 shown below. The two fields together form a frame of video and are alternate displayed on the odd and even lines in an interlaced manner. Referring back to FIG. 7, each of these lines correspond to vertical direction and each line with a field will be every other line, where each of the numbers along the bottom of the traces in FIGS. 9 and 10 correspond to a line. The lines 1-19 of Field 1 and lines 263-281 of Field 2 are part of the vertical blanking interval, with the active video for the two fields respectively starting at line 20 and line 282. In FIGS. 9 and 10, the amplitude of the wave forms is represented in terms of IRE (a standard unit in the measurement of composite video signals, the name derived from Institute of Radio Engineers) and the duration of a horizontal line interval is labelled "H".

NTSC uses two vertical synchronization pulses, one for each field, to synchronize the frame. The first pulse includes lines 4 through 6, and the second pulse starts midway through line 266 and continues midway through line 269. In FIG. 7, this corresponds to the lines in the blanking interval where Vsync is high. The "colorburst" on the leading edge of lines 10 and 273 and subsequent lines in each frame is related to the synchronization of the different color signals.

It is common for NTSC cameras to not put active video on the first two lines and last two lines of each field that are reserved for active video (i.e., lines 524-525, 20-21, 262-263, and 282-283) as these lines would often be lost on a display. In embodiments presented here, these lines can be included in the vertical synchronization and hopping period. To allow for time to hop and also remove the standard NTSC frame synchronization, lines 524 through 8, and lines 262 through 271 are replace as illustrated in the embodiment of FIG. 10, where these periods are now used as the hop intervals. Since no active video information exists during these intervals, there is no data lost during hopping. Any line that would normally be an active video line will be blanked in the recovered video.

To establish frame synchronization after the hop interval, the embodiment of FIG. 10 adds frame synchronization for Field 1 to lines 12 through 18, and frame synchronization for Field 2 to lines 275 through 281. A single bit "HOP" indication can also be added to lines 19 and 282. If the "HOP" level is greater than a specified amplitude, such 60 IRE, this indicates that the video sender is frequency hopping; and if the level is less than the specified amplitude, the video sender's frequency is static. In that way, the requirement to hop is passed through the active video signal.

Figure 11:
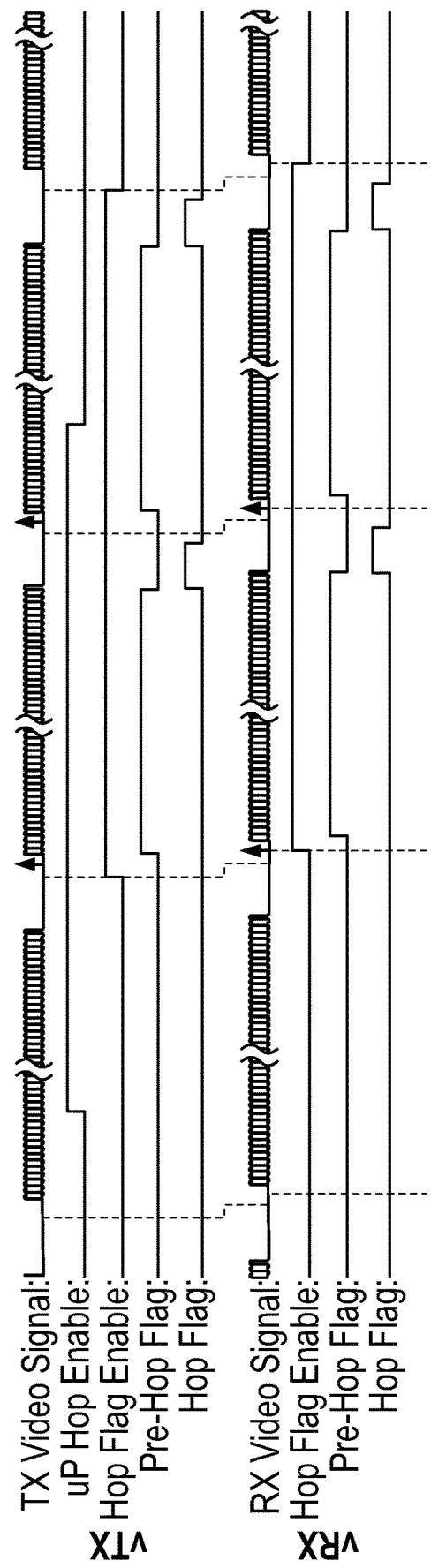
FIG. 11 illustrates an embodiment of frequency hop enabling steps and timing.

FIG. 11 illustrates an embodiment of hop enable steps and timing. The top portion of FIG. 11, labelled vTX, corresponds to the video signal sent from the drone (TX Video Signal), the value of a hop enable bit (uP Hop Enable), and a corresponding set of control signals and flags. The lower portion of FIG. 11, labelled vRX, corresponds to the video signal sent from the drone and received at the ground station (RX Video Signal) and a corresponding set of control signals and flags.

At the beginning TX Video Signal line, the drone 101 begins transmitting a first of a series of fields of video data, the field is received at the ground station 103 as shown at the RX Video Signal line. When the ground station 103 deems that the video from a drone 101 is good, it sends a signal via the ground station control radio block 331 to the drone's microcontroller 441. The drone microcontroller 441 then enables the uP Hop Enable bit in the drone's FPGA 443, as shown in the second vTX line. The uP Hop Enable bit can be latched into the Hop Flag Enable bit during the horizontal sync of Line 19 or Line 281.

The Hop signal is sent based on the state of the Hop Enable bit sent to the video receiver section 301 during line 19 or Line 281, where an enabled state indication of the Hop signal is represented by the arrow near the beginning of the field. For this example, this shown as enabled going in to the second and third fields, after which it is reset.

When the Hop is enabled, during the horizontal synchronization of Line 20 or Line 282 of the next field, the Hop Flag Enable bit of both the video transmitter section 402 and the video receiver section 301 is latched with the state of the Hop signal. Also, during the horizontal sync of Line 20 or Line 282, if the Hop Flag Enable bit is set, a Pre-Hop Flag is set triggering the drone's FPGA 443 to start the load for the frequency synthesizer 457 for the next hop. During the horizontal synchronizing signal of Line 2 or Line 264, the Pre-Hop Flag is disabled, and the Hop Flag is enabled, triggering the drone's FPGA 443 to finish the load for the frequency synthesizer 457 and move to the next frequency.

When the Hop Flag is enabled on the drone, the output of the quadrature modulator 453 is disabled by the FPGA 443, and the power amplifier PA 452 is disabled by the drone's FPGA 443 to ensure the video transmitter section is not operating when the frequency is changing. On the ground station 103, when the Hop Flag is enabled the switches 315 and 316 are set according.

Figure 12:
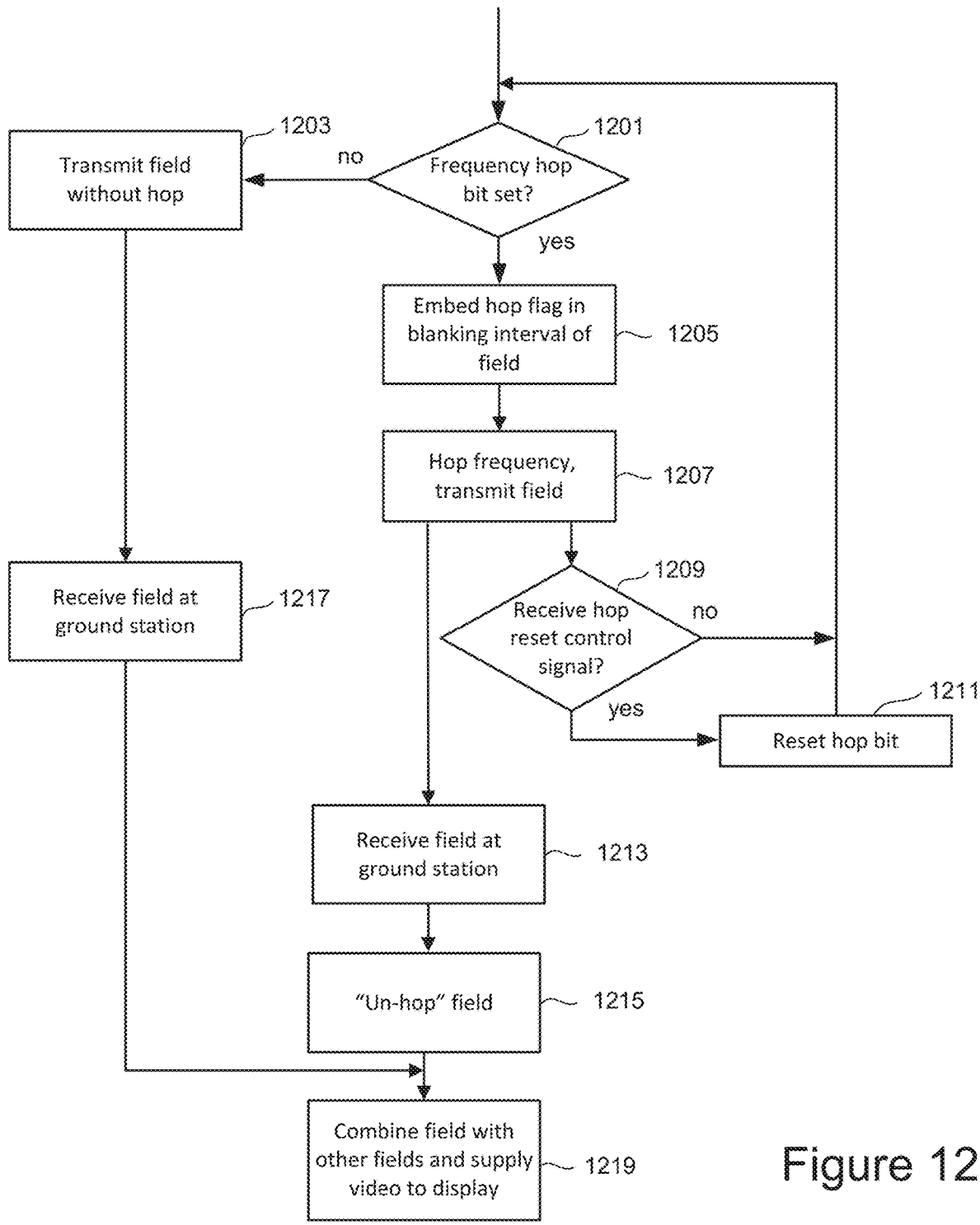
FIG. 12 a flowchart illustrating an embodiment of synchronized frequency hopping.

FIG. 12 a flowchart illustrating an embodiment of synchronized hopping based on FIGS. 10 and 11, following on from the flow of FIG. 8 after the uP Hop Enable bit is set in step 809 and hopping begins. At step 1201, the hop bit is checked to see whether it is set and, if not, at step 1203 the field (or frame if a non-interlaced format is used for the video) is transmitted from the drone's video transmitter section 402, received by the ground station's video receiver section 301 at step 1217, and where the fields are combined at step 1219 to provide the video to the display device 191 or output 192.

If the uP Hop Enable bit is set at step 1201, at step 1205 the hop flag is embedded in the blanking interval of the field (or frame if a non-interlaced format is used for the video) as illustrated with respect to FIG. 10 and the field is transmitted from the drone's video transmitter section 402 at step 1207. Step 1209 checks on whether the ground station 103 has sent a control signal to stop hopping and reset the Hop Enable bit and, if so, resetting the Hop Enable bit at step 1211 before looping back to step 1201 for the next field.

The video field transmitted at step 1207 is received at the by the ground station's video receiver section 301 at step 1213, where, through use of the switches 315 and 316 of the video receiver blocks 317 at step 1215. At step 1219, the different fields of the video received from the drone 101 are assembled by the ground station's FPGA 307 and supplied to the pilot's display device 191, the video output 192, or both.

Figure 13:
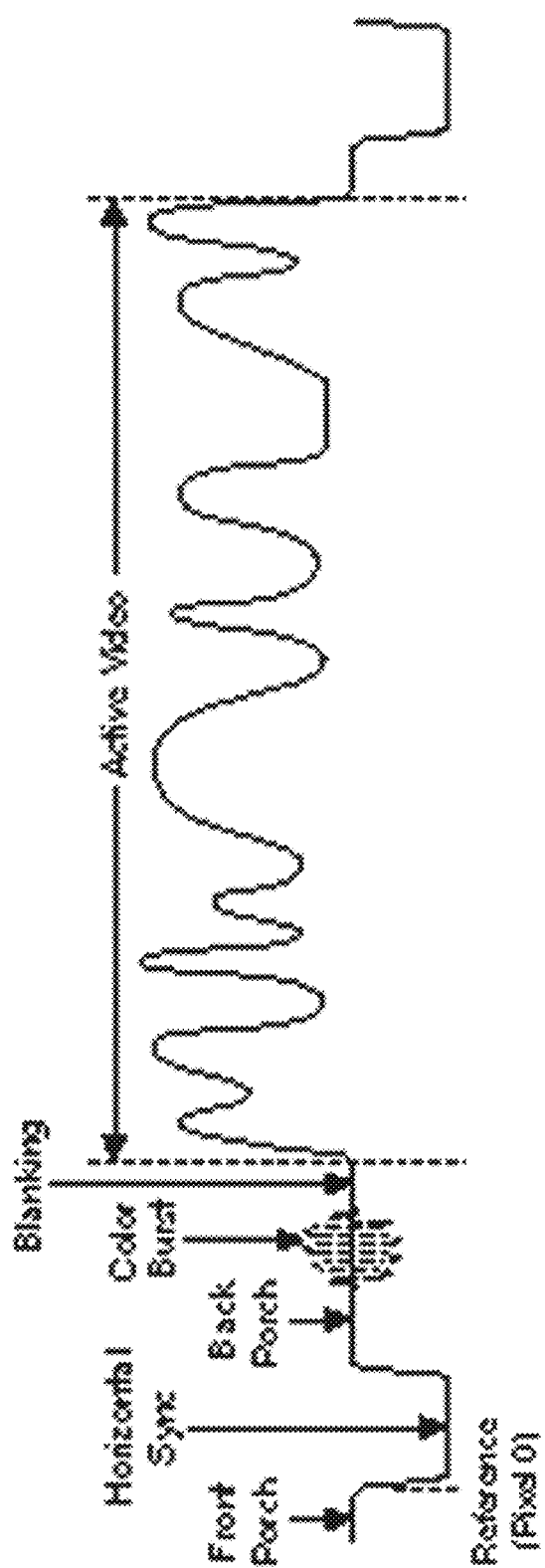
FIG. 13 illustrates a NTSC video line composition.

In addition to frequency hopping to make the video signal harder to detect or jam, scrambling of the individually lines of video can additionally or alternately be used. FIG. 13 illustrates the composition of a video line, again for the example of a NTSC embodiment.

FIG. 13 corresponds to one of the individual lines of a frame or field of FIG. 7 after the vertical blanking interval that includes active video. As represented in FIG. 7, each of these lines will include an initial horizontal blanking interval (including the horizontal synchronizing portion, Hsync) followed by the active video of the line. FIG. 13 illustrates a waveform of such a line in more detail. The horizontal blanking interval begins with a "front porch" region, corresponding to a region following a previous scan line of a raster scan when the electron beam would have still been moving to the right, and a "back porch" region, corresponding to a region before the active video of the next scan line of a raster scan when the electron beam would have begun moving to the right again. In between the front porch and the back porch is the horizontal synchronizing pulse, which corresponds to when the electron beam was moved rapidly to the left in a raster scan and has a minimal "blacker than black" amplitude as it was not to be seem on the display. The pixels of a line are numbered with reference to the beginning of the horizontal synchronizing pules. Before the active video, a colorburst can be used for synchronization of the different color signals with a given line.

With respect to scrambling, prior to transmitting, the active video region of the NTSC scan line depicted in FIG. 8 on each individual line can be subject to either a pass-through or inversion based on a shared key. In addition to the split frame hopping (i.e., hopping the frames of the field separately), this inverting of the RF signal creates a second layer of scrambling as the sequence is only known through an encrypted handshake at the beginning of a mission. An additional method of scrambling that can be employed in this system is the suppression before transmission, and subsequent recreation at the receiver, of the vertical synchronizing intervals at the start of the each of the fields of a frame. The suppressed vertical synchronizing intervals can be replaced with a custom start of frame header.

Figure 14:
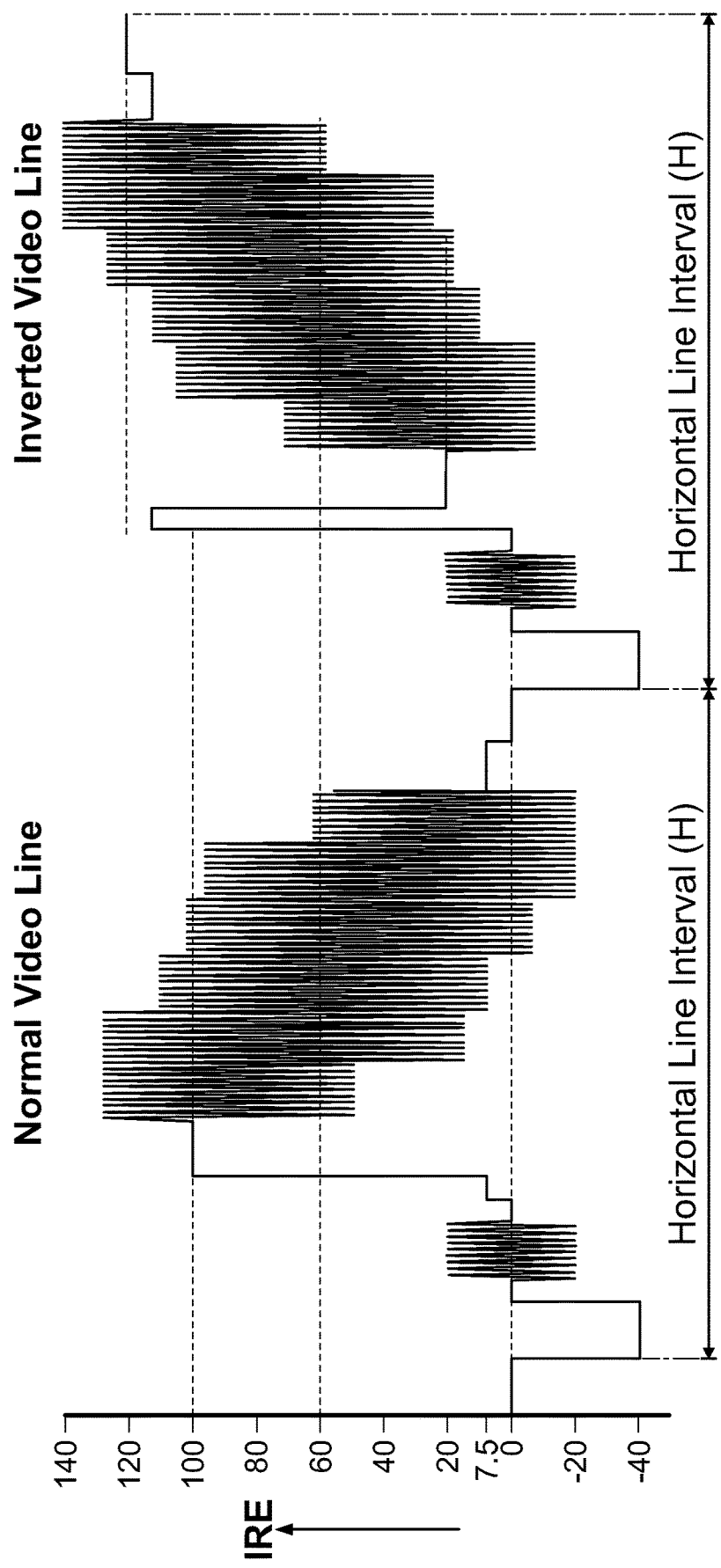
FIG. 14 is a schematic representation of video line inversion.

FIG. 14 is a schematic representation of video line inversion, where a line non-inverted video is followed by an inverted line. To further obfuscate the video signal RF inversion, certain video lines can be inverted and others not be inverted based on a code that can be stored in both the drone 101 and ground station 103, where the code can be updated at any time. In FIG. 14, the interval corresponding to the first line of video data begins with the horizontal synchronizing pulse and colorburst of the horizontal blanking interval, followed by the active video portion. After the blanking interval follows the portion of the line including the active video portion.

For the second line of video data, the horizontal blanking interval, including the horizontal synchronizing pulse and colorburst portions of the horizontal line interval are standard. For the portion of the line of video data after the blanking interval that includes the active video portion, the signal is now RF inverted about the IRE=60 line. When received at the ground station 103, the FPGA 307 would need to re-invert this portion of the line before display.

One set of effective embodiments for video obfuscation is when adjacent video lines have opposite inversion characteristics. In other words, when one line is inverted and the next line normal or vice versa. However, simply inverting every other line makes it easier to unscramble the video. To make the code always yield a well obfuscated video, a scramble code can map four consecutive frame lines (two from each field) at a time in a way such that no more than two lines at a time have similar inversion characteristics.

Letting x represent which 4 lines are being encoding, when x is zero the drone's FPGA 443 encodes the top 4 lines of active video, when x is one, the FPGA 443 encodes the next 4 lines of active video, and so on. Again using the NTSC format as an example, the topmost line of active video as displayed in the video frame (see FIG. 9) is line 282 from Field 2, followed by line 20 from Field 1, line 283 from field 2, and line 21 from field 2. If variable x is a value from 0 to 121, all video lines can be encoded as represented in Table 1, which illustrates an embodiment for a video line mapping for a four-line scramble code.

TABLE 1

| | Four Line Scramble Code | | | |
|---|---|---|---|---|
| Line | 0 | 1 | 2 | 3 |
| 2x + 282 | Normal | Normal | Inverted | Inverted |
| 2x + 20 | Inverted | Inverted | Normal | Normal |
| 2x + 283 | Normal | Inverted | Inverted | Normal |
| 2x + 21 | Inverted | Normal | Normal | Inverted |

Regardless of the scramble code which precedes the four lines or follows the four lines, no more than two lines at a time will have similar inversion characteristics. Also, if the four lines are descrambled with the wrong code, at most only two of the four lines will be correctly descrambled, resulting in the video signal remaining obfuscated. In addition, since the two descrambled lines will always be adjacent, only one line of the two lines per field will be correctly descrambled. This can be illustrated with respect to Table 2, which lists the correct lines visible based on the descramble code used.

TABLE 2

| | Attempted Code | | | |
|---|---|---|---|---|
| Correct Code | 0 | 1 | 2 | 3 |
| 0 | 1 2 3 4 | 1 2 | None | 3 4 |
| 1 | 1 2 | 1 2 3 4 | 3 4 | None |
| 2 | None | 3 4 | 1 2 3 4 | 1 2 |
| 3 | 3 4 | None | 1 2 | 1 2 3 4 |

As described above, a number of different elements can be incorporated to obfuscate the video signal transmitted form the drone 101 to the ground station 103, where, as used here, obfuscate includes the processing of the video signal to make it more difficult to intercept or jam. Examples of the techniques described here include obfuscation of the vertical synchronizing signal through encoding, frequency hopping, and line inversion. As described with respect to FIGS. 7-12, embodiments of the frequency hopping process can use a change to the vertical synchronizing portion of a video field, transmitting hopping information within the frame itself, and the use of accurate demining. As described with respect to FIGS. 13 and 14 and Tables 1 and 2, embodiments for line inversion can be based on a four-line codes.

Figure 15:
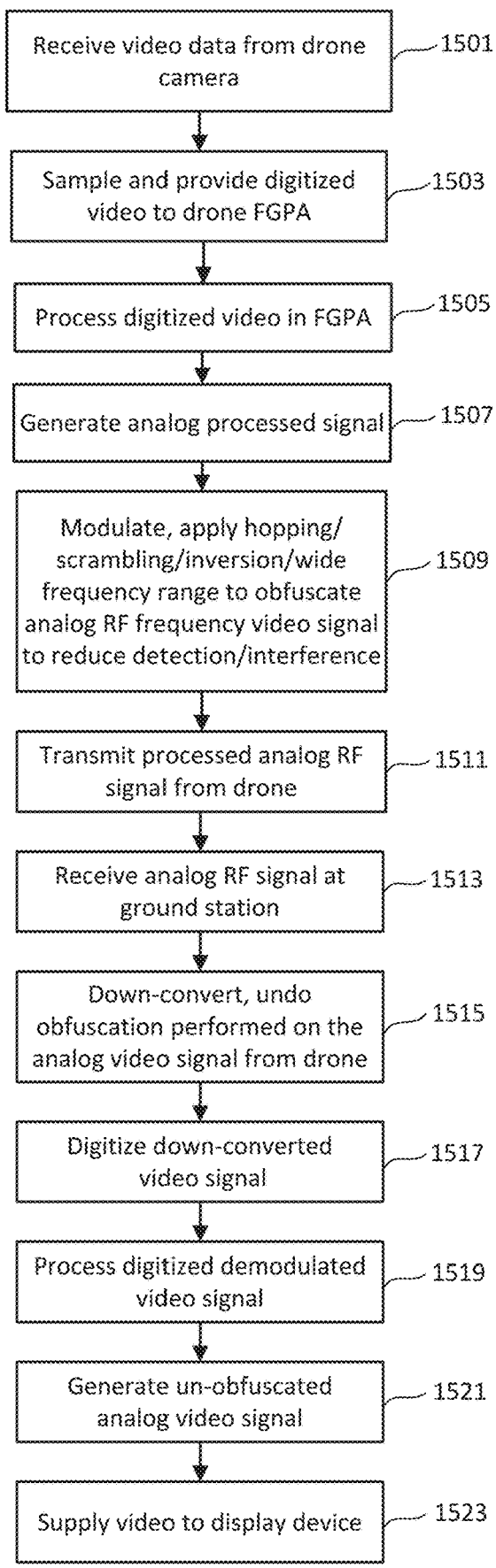
FIG. 15 is a flow chart illustrating one embodiment for transmission of a video signal from a drone to a ground station.

FIG. 15 is a flow chart illustrating one embodiment for transmission of a video signal from a drone 101 to a ground station 103 using these obfuscation techniques to reduce detection and interference of the video signal. Starting at step 1501, the drone's camera 447 generate the video data, which is then sampled by ADC 445 at step 1503 and the digitized data is supplied to FPGA 443. At step 1505 FPGA 443 processes the video, which is then used to generate processed analog data through DAC 449 at step 1507.

At step 1509, the processed analog signal is up-converted by the quadrature modulator 453 and further processed to make it more difficult to detect or interfere with. The analog signal is also treated to one or more of the anti-detection and anti-interference measures described above with respect to FIGS. 7-14 by use of microcontroller 441 and synthesizer 457. Although the flow of FIG. 15 includes these various video obfuscation measures as part of step 1509, some of all of these measures can be performed in the FPGA 443 as part of the digital signal processing at step 1505 prior to the conversion to analog form at step 1507, but for purposes of this discussion are all grouped into the single step at 1509. As previously described, these measures can include one or more of frequency hopping, scrambling, signal inversion, encryption and use of a wide bandwidth for the NTSC RF signal, for example. The RF signal from the quadrature modulator 453 is then amplified by PA 452 to provide the RF signal for the antenna 454 that is then transmitted at step 1511.

The analog RF data is then received at the ground station at step 1513 at the antennae 321. At step 1515, the switched video receiver blocks 317 receive the RF signal from the antennae, which are then downconverted by the mixers 347 using the local oscillator frequencies from VCOs 349. These elements can reverse some of the measures, such as hopping, that were taken on the drone to prevent detection and interference on the transmitted RF video signal. Other measures can be reversed as part of the digital processing at step 1519. Some examples of the measures that can be reversed in these steps can include one or more of recreating the vertical sync intervals, undoing any RF inversion, accounting for frame hopping, descrambling and so on.

Once the captured video is downconverted at step 1515, it can then be digitized in the ADC blocks 313 at step 1517 and processed in the ground station's FPGA 307 at step 1519, so that the video processing performed to obfuscated the video by the drone 101 before transmission is reversed and the analog video as seen by the camera 447 is "restored". An analog video signal is generated by DAC 309 at step 1521, which can then be supplied to a digital display device 191 for a pilot to view and/or to the outlet 192 at step 1523.

Figure 16:
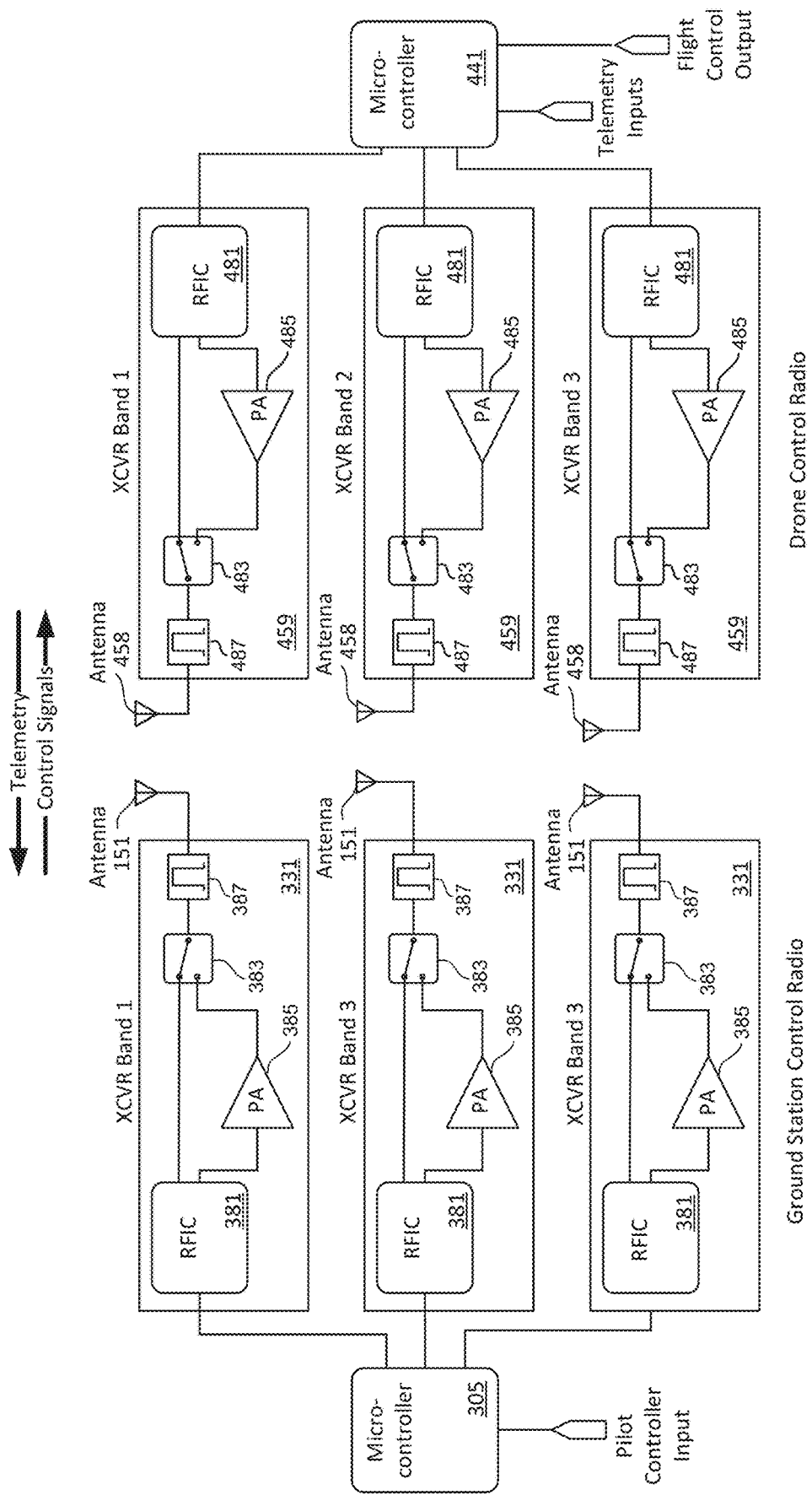
FIG. 16 illustrates some components for embodiments of the control radio for a ground station and the control radio for a drone.

Now turning to consider the control channel further, the control transceivers of the ground station 103 and the drone are responsible for communicating control packets from the ground station 103 to the drone 101 (uplink) and telemetry data from the drone 101 to the ground station 103 (downlink). A digital, low latency communication link can be hardware encrypted for security. In addition, this link can include multiple redundant physical layers for interference avoidance. Each RF link can frequency hop in a designated band. The drone control radio transceivers 459 and ground station control radio transceivers 331 can be very similar in architecture; however actual implementation on both sides may vary with regards to antenna selection. FIG. 16 illustrates some components for embodiments of the control radio for ground station 103 and the control radio for drone 101 taken FIGS. 3 and 4A.

The left side of FIG. 16 illustrates some components of an embodiment for a ground station control radio. The pilot's controller is connectable to the microcontroller 305 that is connected to, in this example, three antennae 151 through a corresponding ground station control radio block XCVR 331. The shown embodiment has three transceivers XCVR 331 for three bands. Each ground station control radio block 331 includes a Radio Frequency Integrated Circuit (RFIC) 381 connected by a receive path and, through a power amplifier PA 385, transmit path to the corresponding antenna 151. A switch 383 selects between the transmit path and the receive path and a filter 387 is shown between the switch 383 and the antenna 151. The ground station control radio is discussed in more detail above with respect to FIG. 3.

The right side of FIG. 16 illustrates some components of an embodiment for a drone side control radio. The drone side control radio can use a similar structure to the ground station side control radio and again is illustrated for a three band embodiment. The microcontroller 441 is connected to the flight controller (461, FIG. 4A) to receive telemetry inputs and provide flight control inputs for the motors connected to the drone's rotors. To transfer out the telemetry data to the ground station and receive the flight control data back from the ground station, the drone's microcontroller 441 is connected to a set of antennae 458, each through a corresponding control transceiver 459 for each band. As on the ground station side, each control transceiver XCVR 459 includes a radio frequency integrated circuit (RFIC) 481 connected to the microcontroller 441 on one side and, through a switch 483 and filter 487, to a corresponding antenna 454 on the other. The switch provides for an input path and, though the power amplifier PA 485, an output path. The drone control radio is discussed in more detail above with respect to FIG. 4A.

In one set of embodiments, the control transceivers 331 on the ground station side and 459 on the drone side can provide a maximum RF Transmit Power of 1 W. The control RF transmit power can be controllable, with a minimum RF transmit power ~10 dBm, for example, and a resolution/step size of 1 dB, where greater resolution is acceptable, though not required. The control radios can be functional of an operating range of 0° C. to +70° C. in a typical application. The embodiment of FIG. 16 illustrates the use of three frequency bands, although other embodiments can employ a larger or smaller number. In one embodiment using three bands, an example of frequency bands is illustrated in Table 3.

TABLE 3

| Transceiver Index | Minimum Frequency (MHz) | Maximum Frequency (MHz) |
| --- | --- | --- |
| 1 | 200 | 220 |
| 2 | 420 | 490 |
| 3 | 840 | 950 |

Processing, including encryption, anti-jamming, modulation and hopping can all be applied to the control signals exchanged between a drone and a ground station. The data payload can be encrypted, such as by AES 256 hardware for example. A session key can be shared during a pairing session prior to each mission. The key may also be updated over the secure channel during the mission if desired.

With respect to anti-jamming, the control system can consist of, in this example, three discrete transceiver implementations, each designed with high rejection band filters to reduce out-of-band jamming signals. The bands can be separated by wide frequency ranges and be capable of sending redundant data. An RF jamming source would need to track and disrupt all three bands simultaneously, or generate a wideband, high power jammer to cover a very large relative bandwidth.

To reduce detection ability of the control signal, the system can transmit uplink packets and receive diagnostic downlink packets on one of the transceiver pairs (331, 459 for each of the, in this example, three bands). When multiple packet loss, or, more generally, control signal degradation, is detected, a second transceiver pair can automatically begin transmitting redundant data. For example, if one of the ground station microcontroller 305 or the drone microcontroller 441 detect packet loss, it can notify the other to begin transmitting redundant data and begin transmission of the redundant data itself. If the first transceiver pair returns to 0% (or acceptably low) packet loss, the second transceiver can discontinue transmitting. Likewise, the third transceiver pair can be configured to communicate if the first and second transceiver pairs experience packet loss. In this way, all of the transceiver pairs can be used simultaneously to improve reception likelihood, but they can be used individually to remove the amount of transmitted emissions detectable.

Figure 17:
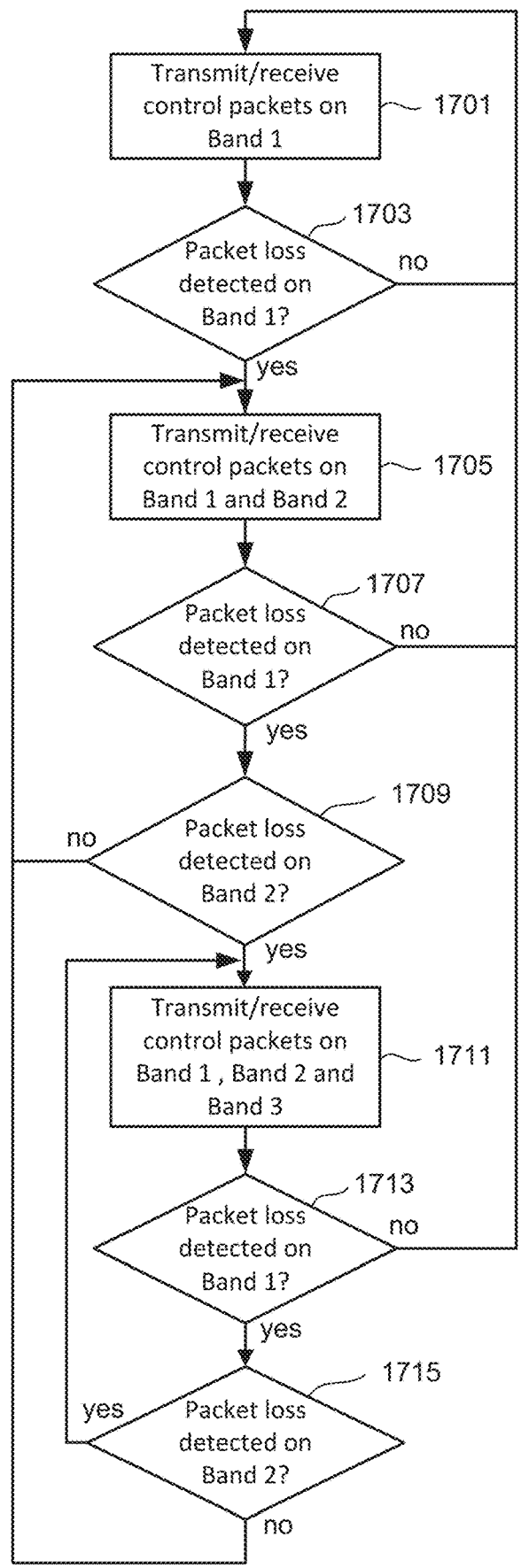
FIG. 17 is a flowchart illustrating one embodiment for using multiple bands and corresponding transceiver pairs to provide redundancy.

FIG. 17 is a flowchart illustrating one embodiment for using multiple bands and corresponding transceiver pairs to provide redundancy. Starting at step 1701, the ground station and drone transceiver pair 331, 459 for Band 1 are used to exchange control signal packets. While doing so, the corresponding microcontrollers 305, 441 can monitor for packet loss on Band 1 at step 1703, where, if no (or an acceptable amount of) packet loss is found, the ground station 103 and drone 101 continue to just Band 1 for the control signal channel.

If, however, significant packet loss is found during the monitoring of step 1703, at step 1705 the control channel can also begin redundant exchange of control signal packets by use of the Band 2 ground station and drone transceiver pair (331, 459). The embodiment illustrated with respect to FIG. 17 uses a redundancy arrangement, where the signals continue to be exchanged on Band 1 at the same time that Band 2 is used, but in other embodiments when the additional frequency band comes in to use the use of the previous band could be discontinued.

While exchanging control signals on both of Band 1 and Band 2, step 1707 continues to monitor of packets exchanged over Band 1 as in step 1703. If no (or an acceptable amount of) packet loss is found on Band 1, the flow can loop back to step 1701 and the ground station 103 and drone 101 can revert back to just Band 1 for the control signal channel. If step 1707 continues to find significant packet loss, the flow goes to step 1709 to monitor whether significant packet loss is also occur for the packets exchanged over Band 2: if not, the flow loops back to step 1705 and the ground station 103 and drone 101 continue to use Band 1 and Band 2 transceiver pairs 331, 459: if Band 2 is also experiencing significant control packer loss, the flow goes to step 1711 and further increases redundancy by also using the transceiver pair 331, 459.

While using Band 1, Band 2 and Band 3, the ground station 103 and drone 101 continue to monitor for control packet loss at steps 1713 and 1715 by the corresponding microcontrollers 305, 441. Step 1713 is equivalent to step 1707 and if significant packet loss is not found for Band 1, the flow loops back to step 1701 and can use just Band 1. If step 1713 continues to find significant packet loss for Band 1, the flow goes to step 1715 to monitor whether significant packet loss is also occurring for the packets exchanged over Band 2. If Band 2 is not experiencing significant packet loss, the flow loops back to step 1705 and the ground station 103 and drone 101 can stop using Band 3. If significant packet loss is also still present on Band 2 at step 1715, the flow can loop back to 1711 and continue to use all three available bands. Although the embodiment discussed here has three available bands, if higher redundancy is wanted the approach can be extended to more bands; and, conversely, if two bands are thought sufficient, a two band embodiment can be used.

For modulation, the control uplink and downlink use modulation, such LoRa™ modulation, for increased dynamic range and blocking immunity to discrete interference. In some embodiments, an adaptive modulation may be used across individual transceivers to optimize the communication link based on whether a wideband or discrete jammer is detected. For example, an FSK signal may be more impervious to wideband jammers, whereas LoRa™ modulation works better in the presence of narrowband sources.

Combined with hopping and a 3× redundant link over a large relative bandwidth, this can provide an extended counter-unmanned aerial system (C-UAS) immunity. Spreading factor is optimized for best performance while meeting the minimum data rates.

With respect to hopping, the control radio can also have the ability to update the hopping sequence during a mission as part of the C-UAS abatement strategy. In addition, hopping for the control signals can occur over a wide bandwidth. The control link can monitor for missed packets and possible interference and adjust hopping and band usage accordingly.

Figure 18:
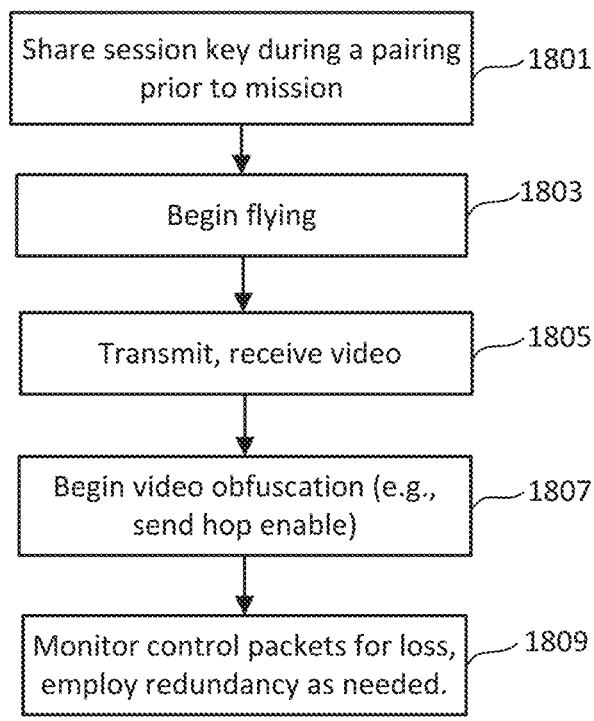
FIG. 18 is flowchart for embodiments of the overall operation of a drone from a ground station presented at a high level.

FIG. 18 is flowchart for an embodiment of the overall operation of a drone from a ground station presented at a high level. Beginning at step 1801, before a mission a session key can be shared between the ground station 103 and drone 101 in a pairing session to use for encrypting the data payload. The key may also be updated over the secure channel during the mission if desired. At step 1803, the drone 101 begin flying under control of a pilot using the controller 193, where control packets are exchanged between the ground station 103 and the drone 101 to provide control inputs to the drone 101 and receive back telemetry at the ground stations. These control channel signal can be exchanged as described above with respect to FIG. 14 using the ground station's control transceivers 331 and the drone's control transceivers 459.

Before or once in flight, the drone 101 begins to transmit video at step 1805 to the r 103 from the drone's video transmission section 402 to the ground control station's video receiver section 301 at step 1805. The video can be obfuscated at step 1807 by one or more to the techniques described above with respect to FIGS. 7-15. For example, as described with respect to FIG. 8, to implement video hopping for transmitting the fields of video, once the ground station 103 begins to receive fields of video from the ground station 103 can send a control signal to drone 101 to set the Hop Enable bit and begin hopping. While in operation, at step 1809 the control signals can be monitored as described with respect to FIG. 17 to implement the use of multiple frequency bands for the transceiver pairs 331, 459 for control signal redundancy. These measures can provide secure control and operation of drones.

In a first set of embodiments, a remote controlled aircraft includes one or more control channel transceivers, a video camera, a video transmitter, and one or more control circuits. The one or more control channel transceivers are configured to exchange digital control signals with a control station. The video transmitter is configured to receive a first video signal from the camera and transmit an analog video signal derived from the first video signal. The one or more control circuits are configured to operate the remote controlled aircraft in response to control signals received through the control channel transceivers. The one or more control circuits are connected to the video transmitter and further configured to obfuscate the analog video signal prior to transmission thereof, including embedding information in the analog video signal for reversing the obfuscation of the analog video signal.

Other embodiments include a control station includes one or more control channel transceivers configured to exchange digital control signals with a remote control aircraft and a video receiver configured to receive an analog video signal from the remote control aircraft. The control station also includes a control input configured to receive pilot input and a video output configured to provide a video signal for pilot display. The control station further includes one or more control circuits configured to provide control signals derived from the pilot input to the control channel transceivers for operation of the remote controlled aircraft and to receive telemetry signals transmitted from the remote controlled aircraft from control channel transceivers, and further configured to extract embedded information in the received analog video signal for reversing obfuscation of the analog video signal and provide the analog video signal to the video output with the obfuscation reversed.

In further embodiments, a system includes a controlled unmanned aircraft and a control station. The controlled unmanned aircraft is configured to operate in response to pilot control signals exchanged with the control station and to process and transmit an analog video signal, wherein the analog video signal is processed to obfuscate the content thereof and to embed therein information to reverse the obfuscation. The control station is configured to receive pilot input from a pilot controller and exchange with the controlled unmanned aircraft pilot control signals derived from the pilot input. The control station is further configured to receive the analog video signal, extract the embedded information and reverse the obfuscation of the received analog video signal using the extracted information.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A remote controlled aircraft, comprising:
one or more control channel transceivers configured to exchange digital control signals with a control station;
a video camera;
a video transmitter configured to receive a first video signal from the video camera and transmit an analog video signal derived from the first video signal; and
one or more control circuits configured to operate the remote controlled aircraft in response to control signals received through the control channel transceivers, the one or more control circuits connected to the video transmitter and further configured to obfuscate the analog video signal prior to transmission thereof, including embedding information in the analog video signal for reversing the obfuscation of the analog video signal.

2. The remote control aircraft of claim 1, wherein the one or more control circuits are configured to obfuscate the analog video signal in response to a control signal received through the control channel transceivers.

3. The remote control aircraft of claim 1, wherein the one or more control circuits are configured to obfuscate the analog video signal though frequency hopping when transmitting the analog video signal.

4. The remote control aircraft of claim 1, wherein the analog video signal includes blanking intervals and embedding information for reversing the obfuscation of the analog video signal in the analog video signal includes embedding information in blanking intervals.

5. The remote control aircraft of claim 1, wherein the one or more control circuits are configured to obfuscate the analog video signal though signal inversion.

6. The remote control aircraft of claim 5, wherein the analog video signal includes a plurality of fields of video data and the signal inversion is performed between adjacent fields.

7. The remote control aircraft of claim 1, wherein the analog video signal includes vertical synchronizing intervals and wherein the one or more control circuits are configured to obfuscate the analog video signal though altering the vertical synchronizing intervals.

8. The remote controlled aircraft of claim 1, wherein the one or more control channel transceivers include a plurality transceivers each configured to operation on a corresponding frequency band, wherein, in response to a determination of signal degradation in the exchanged control signals transmitted over a first of the transceivers, the one or more control circuits are configured to enable a second of the transceivers for redundant exchange of the control signals.

9. The remote control aircraft of claim 1, wherein control signals are received in encrypted form and the one or more control circuits configured to decrypt the control signals received in encrypted form.

10. A control station, comprising:
one or more control channel transceivers configured to exchange digital control signals with a remote control aircraft;
a video receiver configured to receive an analog video signal from the remote control aircraft;
a control input configured to receive pilot input;
a video output configured to provide a video signal for pilot display; and
one or more control circuits configured to provide control signals derived from the pilot input to the control channel transceivers for operation of the remote controlled aircraft and to receive telemetry signals transmitted from the remote controlled aircraft from control channel transceivers, and further configured to extract embedded information in the received analog video signal for reversing obfuscation of the analog video signal and provide the analog video signal to the video output with the obfuscation reversed.

11. The control station of claim 10, wherein the one or more control channel transceivers include a plurality transceivers each configured to operation on a corresponding frequency band, wherein, in response to a determination of signal degradation in the exchanged control signals transmitted over a first of the transceivers, the one or more control circuits are configured to enable a second of the transceivers for redundant exchange of the control signals.

12. The control station of claim 10, wherein control signals are exchanged in encrypted form and the one or more control circuits configured to decrypt the control signals received in encrypted form.

13. The control station of claim 10, wherein the analog video signal includes blanking intervals and the embedding information for reversing obfuscation is embedded in the blanking intervals.

14. The control station of claim 10, wherein the obfuscation of the analog video signal includes frequency hopping.

15. The control station of claim 10, wherein the obfuscation of the analog video signal includes signal inversion.

16. The control station of claim 15, wherein the analog video signal includes a plurality of fields of video data and the signal inversion is performed between adjacent fields.

17. The control station of claim 10, wherein the analog video signal includes vertical synchronizing intervals and wherein the obfuscation of the analog video signal includes altering the vertical synchronizing intervals.

18. A system, comprising:
a controlled unmanned aircraft configured to operate in response to pilot control signals exchanged with a control station and to process and transmit an analog video signal, wherein the analog video signal is processed to obfuscate content thereof and to embed therein information to reverse the obfuscation; and
a control station configured to receive pilot input from a pilot controller and exchange with the controlled unmanned aircraft pilot control signals derived from the pilot input, the control station further configured to receive the analog video signal, extract the embedded information and reverse the obfuscation of the received analog video signal using the extracted information.

19. The system of claim 18, wherein the controlled unmanned aircraft is configured to obfuscate the analog video signal though frequency hopping when transmitting the analog video signal, and wherein the analog video signal includes blanking intervals and the controlled unmanned aircraft is configured to embed the information to reversing the obfuscation in the blanking intervals.

20. The system of claim 18, wherein the controlled unmanned aircraft and the control station each include a plurality transceivers each configured to operation on a corresponding frequency band, wherein, in response to a determination of signal degradation in the exchanged pilot control signals transmitted over a first of the transceivers, the controlled unmanned aircraft and the control station are configured to enable a second of the transceivers for redundant exchange of the control signals.

* * * * *

UNITED STATES PATENT AND TRADEMARK OFFICE
CERTIFICATE OF CORRECTION

PATENT NO. : 11,056,009 B2  
APPLICATION NO. : 16/262122  
DATED : July 6, 2021  
INVENTOR(S) : Tholen et al.

Page 1 of 1

It is certified that error appears in the above-identified patent and that said Letters Patent is hereby corrected as shown below:

In the Claims

Column 18, Line 46 (Claim 5): After "signal" and before "signal" delete "though" and insert -- through --.

Column 18, Lines 57-58 (Claim 8): After "plurality" and before "transceivers" insert -- of --.

Column 18, Line 58 (Claim 8): After "to" and before "on" delete "operation" and insert -- operate --.

Column 19, Lines 21-22 (Claim 11): After "plurality" and before "transceivers" insert -- of --.

Column 19, Line 22 (Claim 11): After "to" and before "on" delete "operation" and insert -- operate --.

Column 20, Line 32 (Claim 20): After "plurality" and before "transceivers" insert -- of --.

Column 20, Line 32 (Claim 20): After "to" and before "on" delete "operation" and insert -- operate --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*